(12) United States Patent
Van Mill et al.

(10) Patent No.: US 9,187,259 B2
(45) Date of Patent: *Nov. 17, 2015

(54) METHOD FOR CONTROLLING AN UNLOAD OPERATION ON A MOBILE FARM IMPLEMENT

(71) Applicant: Unverferth Manufacturing Company, Inc., Kalida, OH (US)

(72) Inventors: Michael D. Van Mill, Shell Rock, IA (US); Shawn W. Gerdeman, Delphos, OH (US); Ronald J. Schlimgen, Shell Rock, IA (US)

(73) Assignee: Unverferth Manufacturing Company, Inc., Kalida, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/213,744

(22) Filed: Mar. 14, 2014

(65) Prior Publication Data

US 2014/0288789 A1    Sep. 25, 2014

Related U.S. Application Data

(60) Provisional application No. 61/799,957, filed on Mar. 15, 2013, provisional application No. 61/821,542, filed on May 9, 2013.

(51) Int. Cl.
*A01D 90/10* (2006.01)
*B65G 43/08* (2006.01)
*G01G 19/02* (2006.01)
*B65G 43/00* (2006.01)

(52) U.S. Cl.
CPC .............. *B65G 43/08* (2013.01); *B65G 43/00* (2013.01); *G01G 19/02* (2013.01)

(58) Field of Classification Search
CPC .......... A01D 90/10; B60P 3/00; B65G 49/00; B65G 43/00; G01G 19/02
USPC ........................................................... 701/50
See application file for complete search history.

(56) References Cited

U.S. PATENT DOCUMENTS

| 2,093,300 A | 9/1937 | Adams et al. |
|---|---|---|
| 2,271,434 A | 1/1942 | Johnhson |
| 2,867,336 A | 1/1959 | Soldini et al. |
| 2,896,771 A | 7/1959 | Mecham |
| 3,074,654 A | 1/1963 | Gugggemos |
| 3,090,515 A | 5/1963 | Crowther |
| 3,493,136 A | 2/1970 | Spellman, Jr. |

(Continued)

OTHER PUBLICATIONS

Dinomica Generale, Grain Scale, web page, Feb. 1, 2011, 2 pages.

(Continued)

*Primary Examiner* — Mary Cheung
*Assistant Examiner* — Yuen Wong
(74) *Attorney, Agent, or Firm* — Rothwell, Figg, Ernst & Manbeck, P.C.

(57) ABSTRACT

A method of automating unloading for a mobile farm implement is presented. The method includes determining whether the speed of the mobile farm implement is below a first threshold. In response to a determination that the speed of the mobile farm implement is below the first threshold, a conveyor is moved to an operating position, where it is used to unload agricultural material from the mobile farm implement. Upon termination of the unloading of the agricultural material, the controller folds the conveyor to a storage or transport position.

8 Claims, 19 Drawing Sheets

(56) References Cited

U.S. PATENT DOCUMENTS

| | | |
|---|---|---|
| 3,498,483 A | 3/1970 | Meharry |
| 3,572,643 A | 3/1971 | Birdsall |
| 3,677,540 A | 7/1972 | Weiss |
| 3,782,528 A | 1/1974 | Burger et al. |
| 3,835,868 A | 9/1974 | Heck |
| 3,837,415 A | 9/1974 | Connors et al. |
| 3,913,850 A | 10/1975 | Daniel |
| 3,968,771 A | 7/1976 | Walgenbach et al. |
| 4,037,745 A | 7/1977 | Hengen et al. |
| 4,044,920 A | 8/1977 | Swartzendruber |
| 4,222,498 A | 9/1980 | Brock |
| 4,236,240 A | 11/1980 | Yoshida |
| 4,345,628 A | 8/1982 | Campbell |
| 4,411,581 A | 10/1983 | Niewold |
| 4,465,211 A | 8/1984 | van der Lely et al. |
| 4,503,803 A | 3/1985 | Barnes |
| 4,522,275 A | 6/1985 | Anderson |
| 4,619,531 A | 10/1986 | Dunstan |
| 4,742,938 A | 5/1988 | Niewold |
| 4,911,256 A | 3/1990 | Attikiouzel |
| 5,016,197 A | 5/1991 | Neumann et al. |
| 5,186,396 A | 2/1993 | Wise et al. |
| 5,285,020 A | 2/1994 | Jurca |
| 5,299,313 A | 3/1994 | Petersen et al. |
| 5,354,526 A | 10/1994 | Jose et al. |
| 5,423,455 A | 6/1995 | Ricciardi et al. |
| 5,424,957 A | 6/1995 | Kerkhoff et al. |
| 5,468,113 A | 11/1995 | Davis |
| 5,484,249 A | 1/1996 | Klatt |
| 5,520,495 A | 5/1996 | Sukup |
| 5,529,455 A | 6/1996 | Kaster et al. |
| 5,718,556 A | 2/1998 | Forsyth |
| 5,764,522 A | 6/1998 | Shalev |
| 5,785,481 A | 7/1998 | Ockels |
| 5,800,116 A | 9/1998 | Smith et al. |
| 5,835,868 A | 11/1998 | McElroy et al. |
| 5,853,244 A | 12/1998 | Hoff et al. |
| 5,880,407 A | 3/1999 | Flammang |
| 5,888,044 A | 3/1999 | Baskerville |
| 6,042,326 A | 3/2000 | Thomas et al. |
| 6,066,809 A | 5/2000 | Campbell et al. |
| 6,120,233 A | 9/2000 | Adam |
| 6,209,880 B1 | 4/2001 | Turnwald |
| 6,325,588 B1 | 12/2001 | Nolin |
| 6,354,465 B2 | 3/2002 | Bell et al. |
| 6,384,349 B1 | 5/2002 | Voll |
| 6,405,855 B1 | 6/2002 | Peltier et al. |
| 6,604,620 B2 | 8/2003 | Dennis |
| 6,621,014 B1 | 9/2003 | Tanner et al. |
| 6,767,174 B2 | 7/2004 | Cresswell |
| 6,814,532 B1 | 11/2004 | Thompson et al. |
| 6,964,551 B1 | 11/2005 | Friesen |
| 6,971,324 B1 | 12/2005 | Beck |
| 7,017,624 B2 | 3/2006 | Reinsch et al. |
| 7,055,559 B2 | 6/2006 | Reinsch et al. |
| 7,104,425 B2 | 9/2006 | Le Roy |
| 7,393,275 B2 | 7/2008 | Voss et al. |
| 7,428,042 B2 | 9/2008 | Ghiraldi |
| 7,454,304 B2 | 11/2008 | Johansen et al. |
| 7,488,149 B2 | 2/2009 | Waldner |
| 7,500,817 B2 | 3/2009 | Furrer et al. |
| 7,507,917 B2 | 3/2009 | Kaltenheuser |
| 7,629,542 B1 | 12/2009 | Harding et al. |
| 7,633,021 B2 | 12/2009 | Pfohl et al. |
| 7,735,365 B2 | 6/2010 | Crain et al. |
| 7,858,888 B2 | 12/2010 | Lucas et al. |
| 7,874,899 B2 | 1/2011 | Mackin et al. |
| 8,097,820 B2 | 1/2012 | Klubertanz |
| 2001/0038018 A1 | 11/2001 | Bell et al. |
| 2003/0042273 A1 | 3/2003 | House |
| 2003/0057055 A1 | 3/2003 | Haukaas et al. |
| 2006/0114743 A1 | 6/2006 | Galijan |
| 2006/0180062 A1 | 8/2006 | Furrer et al. |
| 2008/0127711 A1 | 6/2008 | Farag |
| 2009/0020076 A1 | 1/2009 | Ghiraldi |
| 2009/0099775 A1 | 4/2009 | Mott et al. |
| 2009/0205877 A1 | 8/2009 | Claypool |
| 2010/0009731 A1 | 1/2010 | Coers et al. |
| 2010/0193256 A1 | 8/2010 | Klubertanz |
| 2010/0274452 A1 | 10/2010 | Ringwald et al. |
| 2010/0314221 A1 | 12/2010 | Garberson et al. |
| 2011/0220677 A1 | 9/2011 | Bertolani |
| 2012/0085458 A1* | 4/2012 | Wenzel ............................ 141/10 |
| 2012/0099948 A1 | 4/2012 | Bump et al. |
| 2013/0045067 A1 | 2/2013 | Pickett et al. |
| 2013/0103249 A1 | 4/2013 | Pieper et al. |

OTHER PUBLICATIONS

Canadian Office Action, Application No. 2,578,512, mailed Apr. 10, 2013, 3 pages.

Model 2300 Air System and the Model 4800 Air Drill, both made and sold by Concord, as illustrated in the Concord brochure, 12 pages.

Amendment filed in U.S. Appl. No. 12/862,052 on Mar. 28, 2013, 16 pages.

Digi-Star EZ 400 Operators Manual, Mar. 4, 2008, 22 pages.

* cited by examiner

| Minimum Load Bar Information |||
|---|---|---|
| Location Name | Rated Load (lbs) | Rated Output (mV/V) |
| Hitch | $L_1$ | $O_1$ |
| Left Front | $L_2$ | $O_2$ |
| Left Rear | $L_3$ | $O_3$ |
| Right Front | $L_4$ | $O_4$ |
| Right Rear | $L_5$ | $O_5$ |

Fig. 9E

METHOD FOR CONTROLLING AN UNLOAD OPERATION ON A MOBILE FARM IMPLEMENT

CROSS-REFERENCE TO RELATED APPLICATION

This application claims the benefit of U.S. Provisional Application Ser. No. 61/799,957, filed on Mar. 15, 2013, and U.S. Provisional Application Ser. No. 61/821,542, filed on May 9, 2013, the entire disclosures of which are incorporated herein in their entirety.

BACKGROUND OF THE INVENTION

1. Field of the Invention

The present invention relates generally to farm implements and, more particularly, to methods for controlling an unload operation on a mobile farm implement.

2. Description of the Related Art

Mobile farm implements, such as grain carts and seed tenders, are used to transport agricultural products, such as grain and seed, from a first site where the agricultural products are loaded to a second site where the agricultural products are unloaded. Such mobile farm implements typically include a bin or hopper for storing the agricultural product and a conveyor for unloading agricultural product stored in the bin. The conveyor in such a mobile farm implement is often movable between an unloading position in which the conveyor extends outwardly from the bin to discharge agricultural product stored therein and a stored position in which at least part of the conveyor is pivoted or folded into a more compact profile for ease of transport. For example, the grain cart conveyor may include upper and lower conveyor sections, and the upper conveyor section may be movable between a stored position in which the upper conveyor section is folded along a side of the bin and an unloading position in which the conveyor sections are aligned and the end of the upper conveyor section extends outwardly from the bin. In the unloading position, the conveyor may be used to unload material from the bin.

SUMMARY OF THE INVENTION

A method for controlling an unload operation on a mobile farm implement. In particular, a method for controlling an unload operation in which measurements from sensors on the cart provide information to a processor or controller. The processor or controller sends commands for operations to be performed, such as moving the conveyor into an unload position, opening a container door and, when the unload operation is finished, closing the container door and moving the conveyor into a stored position.

According to one aspect of the invention, a method of controlling an unload operation of a mobile farm implement, wherein the conveyor is movable between a stored position and an operating position, includes the steps of measuring a speed of the mobile farm implement and determining if the speed is at or below a first threshold. The method further includes the steps of, if the speed is at or below a first threshold, moving the conveyor into the operating position and measuring a power takeoff speed. The method also includes the steps of determining if the power takeoff speed is above a second threshold and, if the power takeoff is above a second threshold, unloading material from the mobile farm implement. The method further includes the steps of weighing an amount of material in the mobile farm implement and determining if the weight of the amount of material is below a third threshold. The method also includes the step of, if the weight is below a third threshold, stopping the unloading.

According to another aspect of the invention, the method also includes the step of, if the weight is below a third threshold, moving the conveyor into a stored position.

According to another aspect of the invention, the step of unloading material from the mobile farm implement may include the step of opening a container door. The step of stopping unloading may include the step of closing the container door.

According to another aspect of the invention, the method further includes the step of, prior to the unloading step, determining if a weight of the amount of material is a steady value, and, unloading the material from the farm implement if the weight is steady.

According to another aspect of the invention, the unloading step includes a power takeoff engaging the conveyor to facilitate transfer of material.

BRIEF DESCRIPTION OF THE DRAWINGS

FIGS. 9C-9E illustrate a method of using load cell sensors and a hitch sensor to monitor weight of a mobile farm implement.

DETAILED DESCRIPTION OF THE PRESENT INVENTION

While the present invention may be embodied in many different forms, a number of illustrative embodiments are described herein with the understanding that the present disclosure is to be considered as providing examples and not intended to limit the invention to the preferred embodiments described and/or illustrated herein.

FIGS. 1-4 illustrate an environment in which a handheld control device or controller 100 interacts with mobile farm implements, such as a grain cart 300 or a tractor 200 towing the grain cart, according to an embodiment of the present invention. According to one aspect of the invention, the system provides a handheld control device that may automate at least part of an unloading of agricultural material from a mobile farm implement. The automation may include issuing commands to the mobile farm implement in a desired order and may include automatically monitoring unloading conditions. According to another aspect of the invention, the system provides a handheld control device that is able to communicate with multiple mobile farm implements using different communication protocols. For example, the control device may communicate with one mobile farm implement using an ISO 11783 (i.e., Isobus) protocol and may communicate with another mobile farm implement using an ISO 11898 (i.e., CANbus) protocol. According to yet another aspect of the invention, the system provides a handheld control device that may wirelessly collect sensor data from a mobile farm implement while the control device is located outside the mobile farm implement. For example, a driver in a harvester may wirelessly collect sensor data from a grain cart that is being loaded by the harvester.

Figure 1:
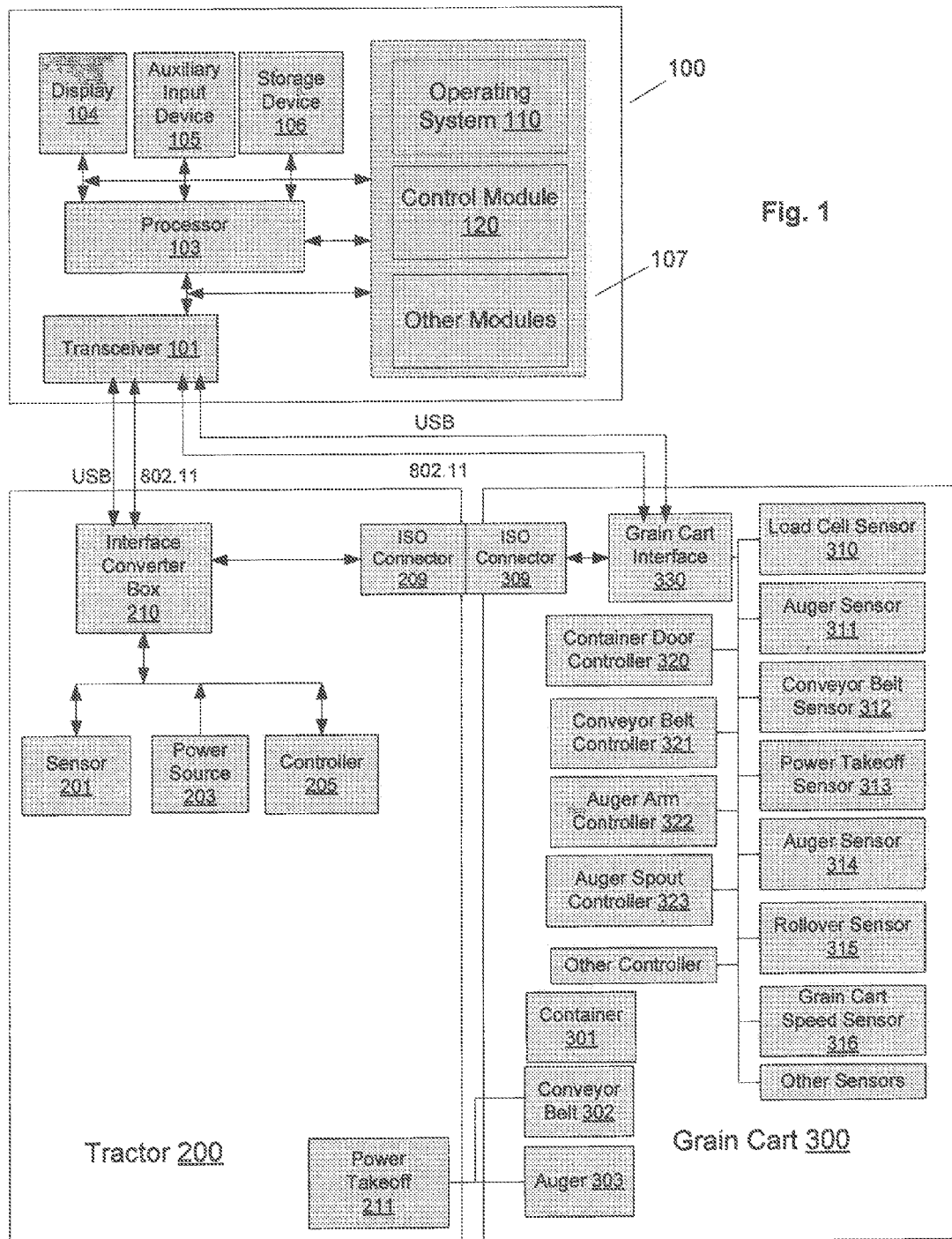
FIG. 1 illustrates a schematic view of a system having mobile farm implements and a control device for interfacing with the mobile farm implements, according to an embodiment of the present invention.

In the embodiment illustrated in FIG. 1, a handheld control device 100 may communicate directly with the grain cart 300, or may do so through another mobile farm implement, such as the tractor 200. For example, the handheld control device 100 and the grain cart 300 may communicate directly via a USB or IEEE 802.11 (Wi-Fi™) or other wired or wireless interface, or the grain cart 300 may have no way of communicating directly with the device and instead rely on a communication interface on the tractor 200 to provide such capabilities to communicate with the control device 100.

In the embodiment shown, the handheld control device 100 may be a mobile phone (e.g., iPhone®), a tablet computer (e.g., iPad®), or any other handheld control device. In other embodiments, the control device 100 may be built-in or mounted to the tractor or the grain cart. The handheld control device 100 may include a transceiver 101 for communicating with a mobile farm implement, a display 104 and auxiliary input device 105 (e.g., a keyboard) for communicating with a user of the control device 100; a processor 103 and memory 107 for executing modules that implement various functionality of the control device; and a storage device 106 for storing data, instructions, and other information. In an embodiment, the modules may include an operating system 110 (e.g., iOS®) that provides a platform on which another module, such as control module 120, executes. For example, the operating system 110 may allow the control module 120 to be downloaded as an application and to execute on the handheld control device 100. (Alternatively, the control module may be displayed through an internet browser application.) In an embodiment, the memory 107 may provide temporary storage for the modules while they are being executed, while the storage device 106 may provide long-term, non-volatile storage for the modules. The components of the handheld control device 100 may be located inside a housing of the device 100, or may be externally attached to the housing of device 100.

Mobile farm implements such as the tractor 200 and the grain cart 300 may interact with the handheld control device 100 by, for instance, sending sensor information to the handheld control device 100 or executing commands received from the device 100. For example, in the embodiment illustrated in FIG. 1, the grain cart 300 may provide information about a container or bin 301, a conveyor belt 302, or an auger 303, and may execute commands related to these components.

For the container 301, one or more load cells or sensors 310 may measure a weight or volume of agricultural material held by the container 301, while a container door controller 320 may be configured to open or close a door of the container 301.

For the conveyor belt 302, a conveyor belt sensor 312 may measure a belt speed of the conveyor belt 302, while a conveyor belt controller 321 may control the belt speed, tension, or any other property of the conveyor belt 302.

For the auger 303, an auger sensor 314 may measure a position or rotational speed of the auger 303, while an auger arm controller 322 or an auger spout controller 323 may control movement of the auger arm or auger spout, respectively. If either the conveyor belt 302 or the auger 303 is driven or powered by another power source such as a power takeoff, then a power takeoff sensor 313 may measure the rotational speed of the power takeoff (e.g., the PTO RPM) on the tractor or towing implement or measure the rotational speed of the implement input driveline (IID) or implement input shaft (IIS) on a mobile farm implement, such as a grain cart or seed tender.

For the grain cart itself, a rollover sensor 315 may detect a weight distribution across the grain cart 300 or any other indication of an uneven load that may tip over the grain cart 300. A grain cart speed sensor 316 may measure a speed of the grain cart 300. Control of the mobile farm implements, including farm implements with a bin or container to load material, is discussed in more detail in co-owned and applications entitled "Weight-Based Chute Control for a Farm Implement," U.S. Provisional Application No. 61/799,099, filed Mar. 15, 2013, and U.S. Provisional Application No. 61/821,552, filed on May 9, 2013, the entire contents of which are incorporated herein by reference.

The tractor 200 may, in an embodiment, likewise have a sensor 201 for measuring a property of the tractor 200, such as speed of a power takeoff 211 used to provide actuation power to the grain cart 300. In an embodiment, it may have a controller 205 for controlling a component (e.g., steering component, transmission component, etc.) on the tractor.

In an embodiment, the transceiver 101 of the control device 100, interface converter box 210 of the tractor 200, and grain cart interface 330 of the grain cart 300 may facilitate communication in the system illustrated in FIG. 1. The interface converter box 210 on the tractor 200 may provide a USB, 802.11, or any other communication interface for communicating with the transceiver 101 on the control device 100. The interface converter box 210 and the grain cart interface 330 may each provide an interface, such as an ISO (e.g., ISO 11783) interface for communicating with each other. The communication may be physically conducted through ISO connector 209 on the tractor 200 and ISO connector 309 on the grain cart 300.

In an embodiment, the interface converter box 210 may provide electrical power from a power source 203 (e.g., battery) on the tractor 200 to the handheld control device 100 or the grain cart 300. The electrical power may be used to, for example, recharge any batteries on the handheld control device 100 or power sensors and controllers on the grain cart 300.

Figure 2:
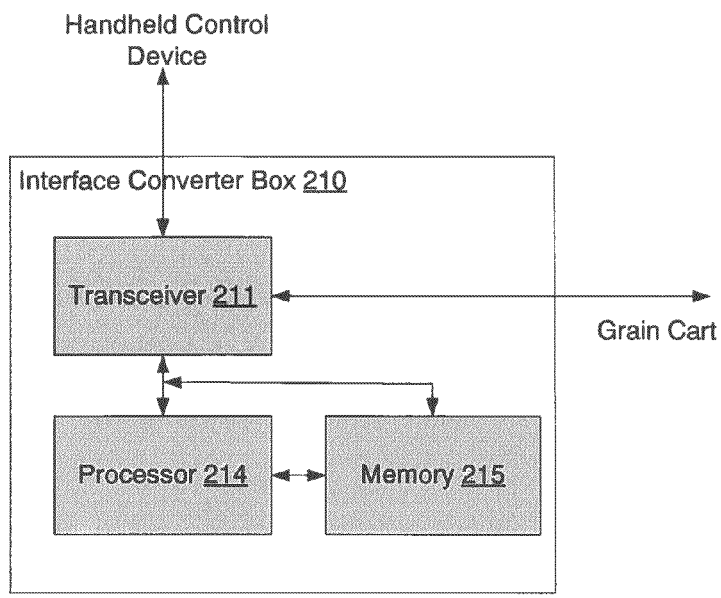
FIG. 2 illustrates a schematic view of an interface converter box on a tractor for interfacing with a control device or with other mobile farm implements, according to an embodiment of the present invention.
Figure 3:
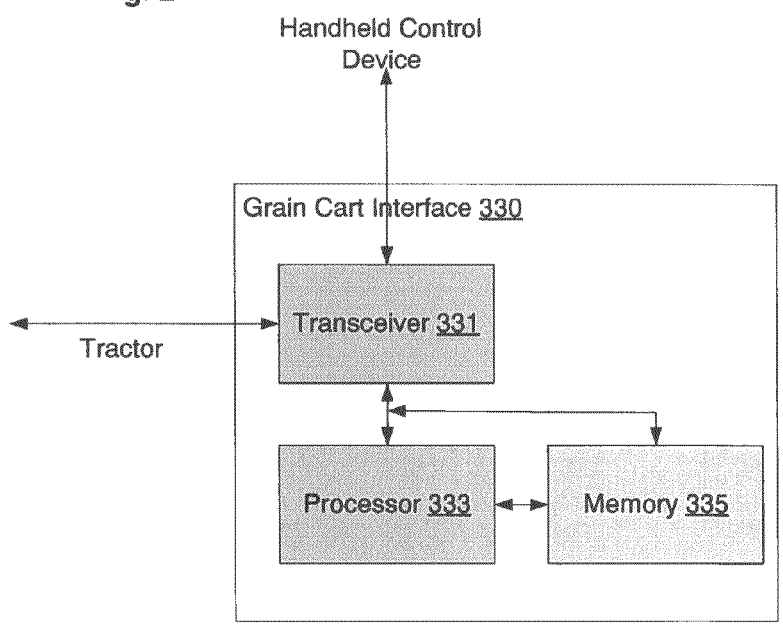
FIG. 3 illustrates a schematic view of an interface on a grain cart for interfacing with a control device or with other mobile farm implements, according to an embodiment of the present invention.

FIGS. 2-3 illustrate various components of the interface converter box 210 and grain cart interface 330. In an embodiment, the interface converter box 210 may relay a signal (e.g., data or command) between the handheld control device 100 and the grain cart 300 without modifying the signal. In an embodiment, the interface converter box 210 may receive a signal from the handheld control device 100 and convert the signal to a format that will be recognized by the grain cart 300. Similarly, the interface converter box 210 may receive a signal from the grain cart 300 and convert the signal to a format that will be recognized by the handheld control device 100. In an embodiment, the conversion may be unnecessary because the control device 100 itself may perform the formatting based on descriptions of different communication protocols used by mobile farm implements.

In an embodiment, the interface converter box 210 may include a transceiver 211 configured to communicate with the handheld control device 100 and the grain cart 300, and may include a processor 214 and memory 215 configured to generate signals having the format that will be recognized by the device 100 or cart 300. Format information for a mobile farm implement may be based on a communication protocol being used by the mobile farm implement. The formatting may be performed by the interface converter box 210 on the tractor 200, or may be performed by the handheld control device 100.

In an embodiment, the memory 215 may cache information passing between the control device 100 and the grain cart 300. In an embodiment, the memory may act as a buffer that stores information intended for the device 100 or the cart 300, and send the information at a later time.

The grain cart interface 330 may, according to an embodiment, include a transceiver 331 configured to communicate with the handheld control device 100 or the tractor 200. It may have a memory 335 configured to store information from the control device 100, information generated by sensors on the grain cart 300, or any other information. A processor 333 may be included to control communication or any other function on the grain cart 300. In some instances, the processor 333 may replace one or more of the controllers illustrated in FIG. 1.

Figure 4:
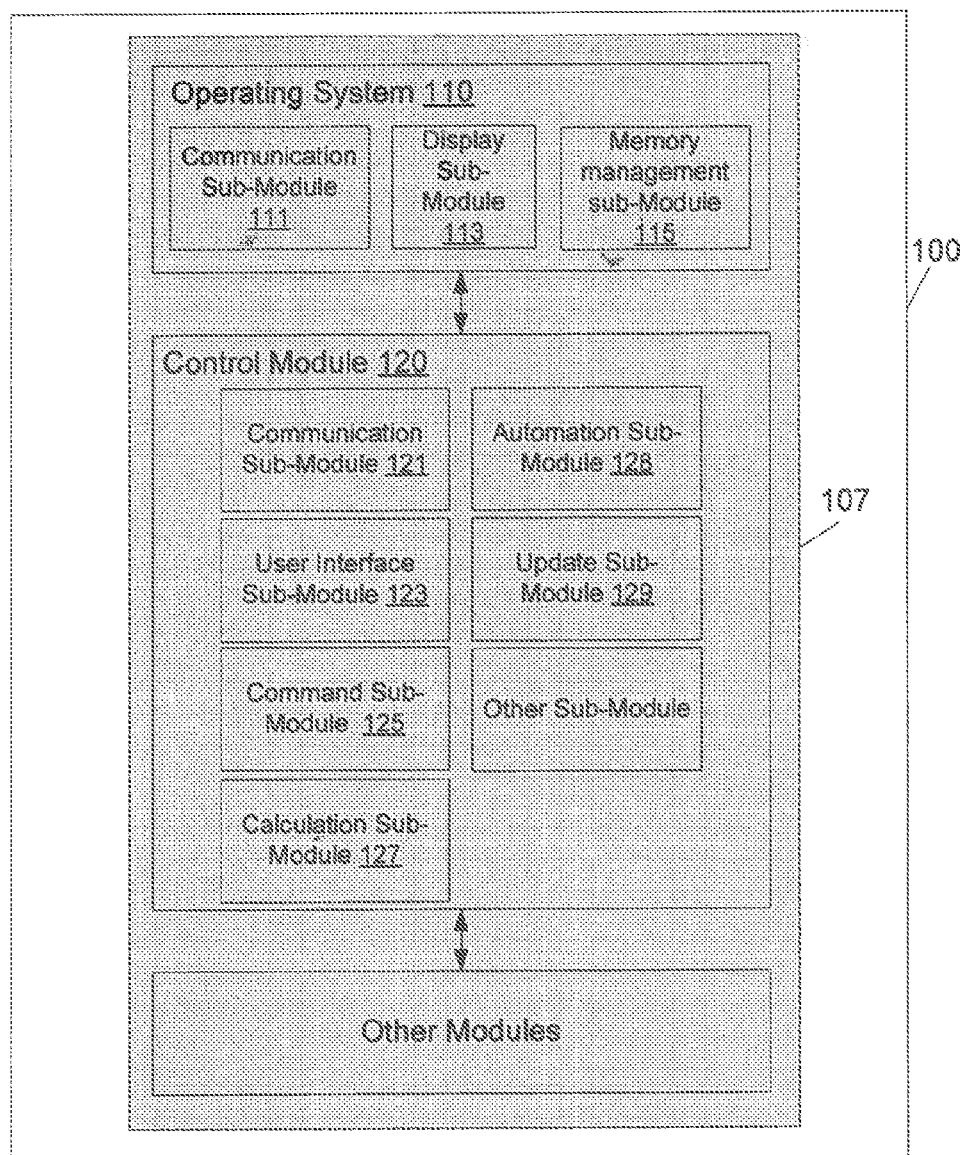
FIG. 4 illustrates a schematic view of various modules being executed on a control device, according to an embodiment of the present invention.

FIG. 4 illustrates various sub-modules of the operating system 110 and control module 120 of the handheld control device 100. As discussed above, the operating system 110 may provide a platform on which other modules, including control module 120, operate. The platform may include a software management system that is configured to download control module 120 as a mobile app or any other software application and to retrieve any updates of the control module 120. Each module may include computer-readable instructions that are loaded in the memory 107 and executed by the processor 103.

In an embodiment, the operating system 110 may include sub-modules for managing components of the handheld control device 100, such as memory, user input, communication, and display. For example, the sub-modules of the operating system 110 may include a communication sub-module 111 configured to manage the transceiver 101, the auxiliary input device 105, or any other communication interface on the control device 100. The sub-modules may further include a display sub-module 113 configured to manage the display 104, and may include a memory management sub-module 115 configured to manage the storage device 106 and the memory 107.

In an embodiment, the control module 120 may include various sub-modules that implement functionalities of the module. For example, a communication sub-module 121 may allow the handheld control device 100 to communicate with the tractor 200 or grain cart 300. The sub-module 121 may rely on the communication sub-module 111 of the operating system to access the transceiver 101 and transmit or receive information. When communicating with the grain cart 300, the sub-module 121 may be configured to place the communication in a format that will be recognized by the grain cart 300, or may rely on another device to do so.

The user interface sub-module 123 may allow the control device 100 to generate menus, forms, or any other user interface. The user interface may display information to users and collect information from them. The sub-module 123 may rely on communication sub-module 111 of the operating system 110 to retrieve information from a user input device (e.g., the keyboard), and may rely on display sub-module 113 of the operating system 110 to display information.

The command sub-module 125 may allow the control device 100 to determine what commands are available for a particular type of mobile farm implement. The sub-module 125 may be configured to generate a command to be outputted to the mobile farm implement. The generated command may be in a format that the mobile farm implement will recognize, or may be converted to an appropriate format by another device.

The calculation sub-module 127 may allow the control device 100 to determine when the tractor 200 or grain cart 300 satisfies or deviates from a particular condition, such as a threshold related to load cell weight, power takeoff, weight distribution, or any other condition. The condition may affect, for example, when a command may begin to execute or when an alarm on the mobile farm implement needs to be activated.

The automation sub-module 128 may be configured to generate a sequence of commands corresponding to a desired action for a mobile farm implement, such as an unloading action on the grain cart 300. The sub-module 128 thus provides a greater degree of automation and frees a user from having to manually invoke each step of the desired action.

The update sub-module 129 may be configured to receive an update to the control module 120, including an update to computer-readable instructions of the module or to information used by the computer-readable instructions.

Figure 5A:
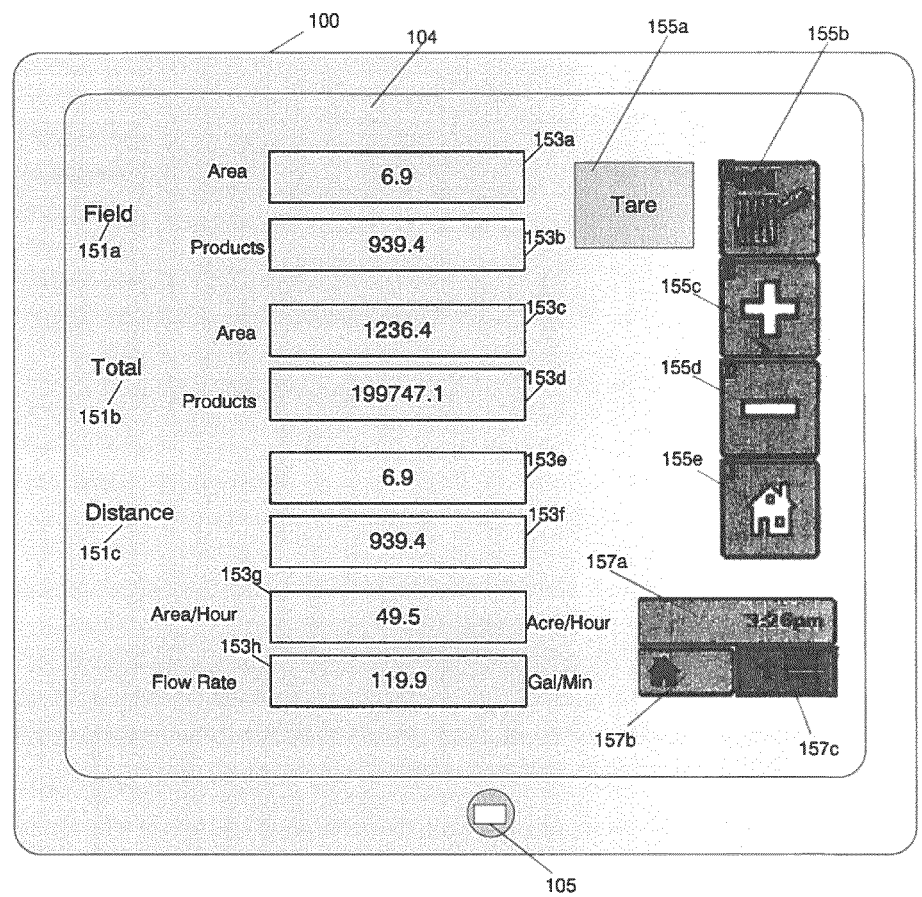
FIGS. 5A and 5B illustrate example views of a user interface on a control device, according to an embodiment of the present invention.
Figure 5B:
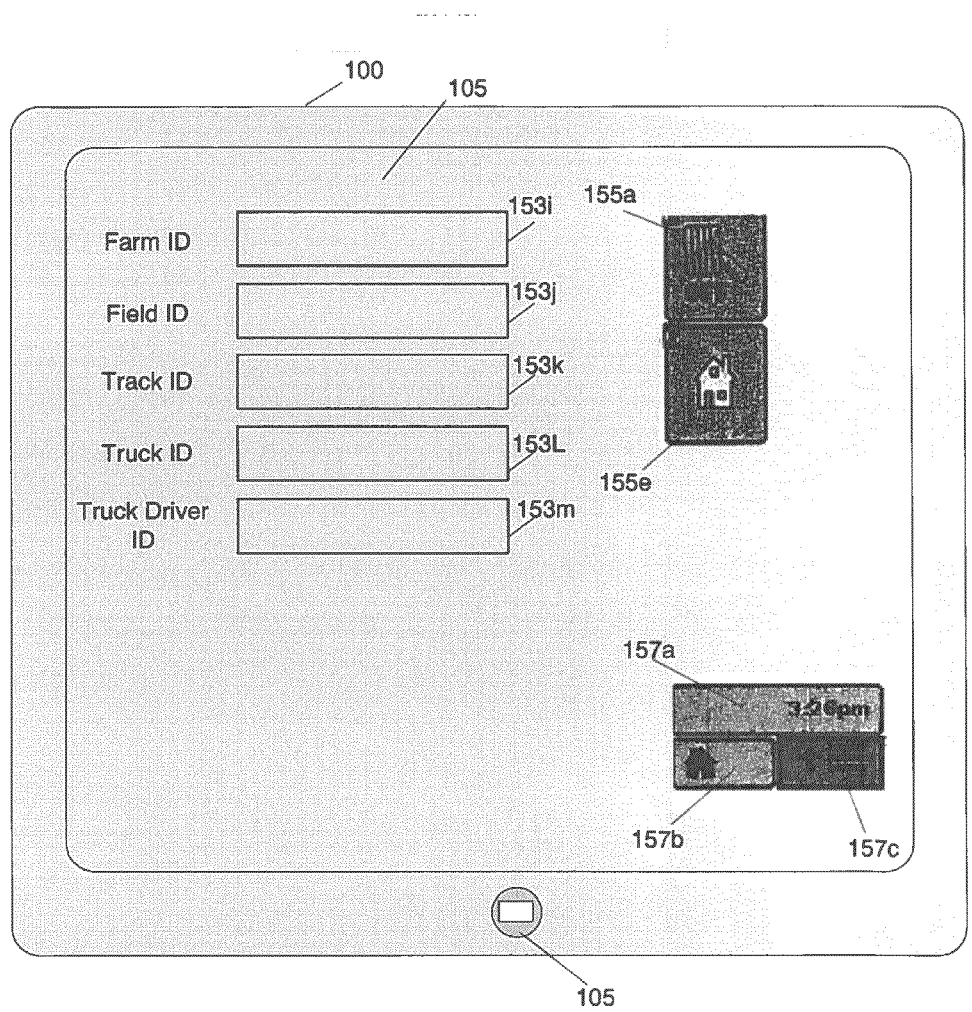

FIGS. 5A-5B illustrate example user interfaces generated by the control module 120 (e.g., by its user interface sub-module 123) and displayed on the display 104 of the control device 100. The user interface may allow a user to monitor operation of a mobile farm implement, provide user input for the operation, or invoke a command on the mobile farm implement. The user interface may display labels, text boxes, command buttons, status bars, or any other user interface. For example, the user interface illustrated in FIG. 5A includes a menu that presents information about loading of the grain cart 300, available commands associated with the loading, and various other information.

Labels 151*a*-151*c* in FIG. 5A are generated on the user interface to identify what type or category of information is being presented. The information may include, for instance, an area that the grain cart 300 has covered and an amount of material that has been loaded onto the grain cart 300. Label 151*a*, named "Field," may be displayed next to a value that shows the covered area and amount of loaded material for a particular field, while label 151*b*, named "Total," may be displayed next to a value that shows the total covered area and total amount of loaded material. Label 151c, named "Distance," may be displayed next to a value that shows a distance that the grain cart 300 has traveled in the particular field and next to another value that shows a total distance that the grain cart 300 has traveled.

Values of various parameters in FIG. 5A may be displayed in output fields, such as text boxes 153a-153h. The text boxes 153a-153f may display the areas and amounts described above, while text box 153g and 153h may display calculated values, such as how much area is being covered by the grain cart 300 every hour or how much products is being loaded into the grain cart 300 every minute.

In an embodiment, the user interface may present command buttons and icons on the user interface. A command button may trigger an action on the mobile farm implement, while an icon may be a status icon that conveys a status of the mobile farm implement or of the handheld control device 100. The command buttons may be virtual buttons presented on a touch screen, thus reducing the number of physical buttons needed by the handheld control device 100. Example command buttons are illustrated in FIG. 5A. Command button 155a allows a user to tare a weight measurement prior to loading or unloading. Command button 155b may trigger a loading or unloading sequence on the grain cart 300. Command buttons 155c and 155d may adjust various quantities, such as a threshold corresponding to the loading or unloading sequence. Command button 155e may allow a user to return to a home menu.

In an embodiment, status icons 157a-157c may indicate a time, a status of the application, such as of control module 120, or any other status.

FIG. 5B illustrates another user interface that is different from the user interface displayed in FIG. 5A. Different functions may use different menus or other user interfaces. For example, the menu illustrated in FIG. 5A may be used to output information to a user, while the menu illustrated in FIG. 5B may be used to collect information from the user. The information may be collected through text boxes, radio buttons, drop-down menus, any other form element, or any other input element. For example, FIG. 5B illustrates input text boxes 153i-153m for collecting a farm ID, field ID, track ID, truck ID, and truck driver ID, respectively, from a user. In an embodiment, the handheld control device 100 may be configured to auto-fill a user input element if it can retrieve or determine the value corresponding to that element. For example, farm ID may be determined based on GPS capability of the control device 100, while truck driver ID may be determined from a user profile stored on the control device 100.

In an embodiment, the interface illustrated in FIG. 5B may also present command buttons, such as command button 155a and 155e. As shown in the figure, command button 155a may be a toggle button that is switched between an on and off state, and its graphics may change corresponding to whether the command is in an on or off state.

Figure 6:
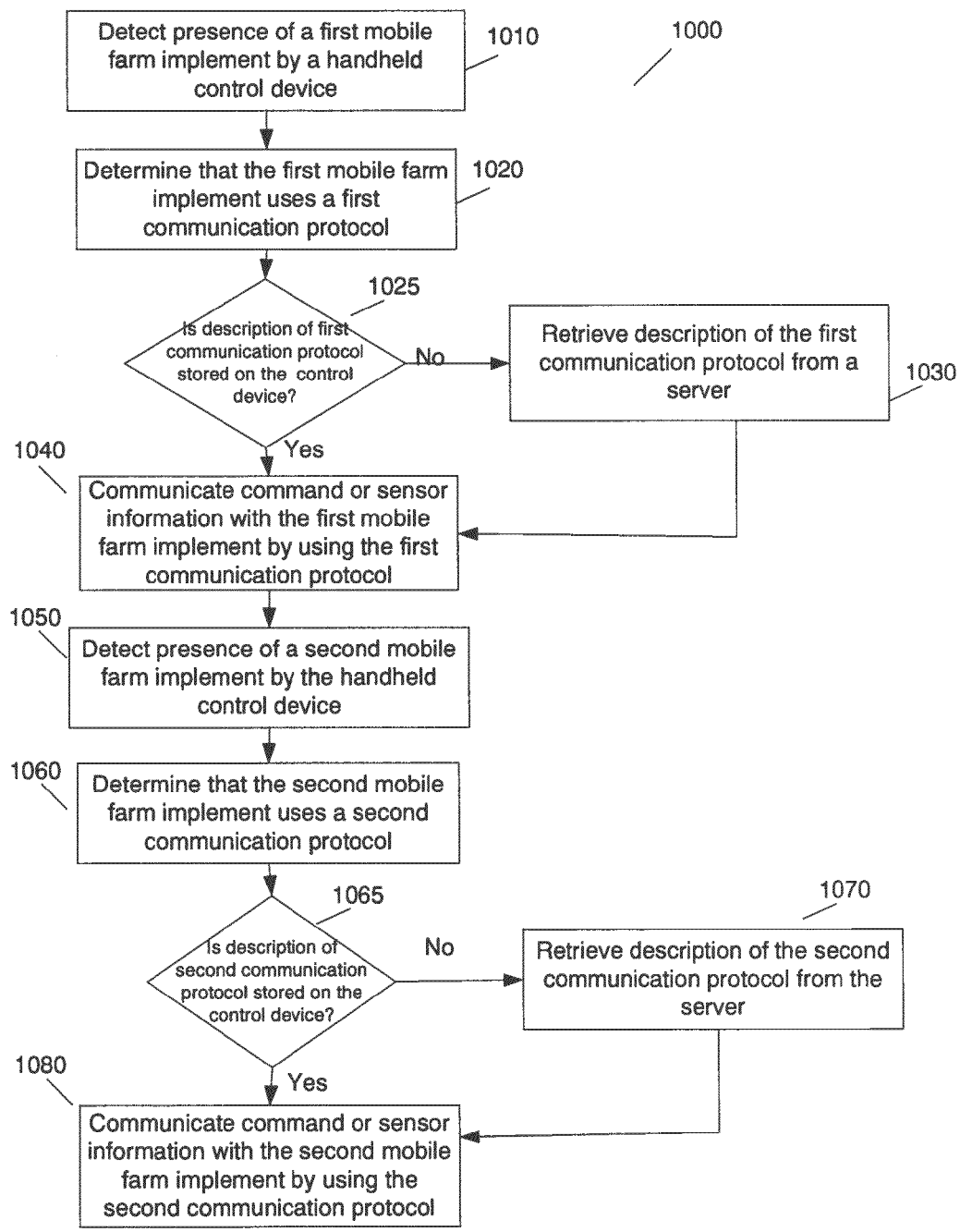
FIG. 6 illustrates a flow chart showing example operations of a method for communicating with different mobile farm implements that use different communication protocols.
Figure 7:
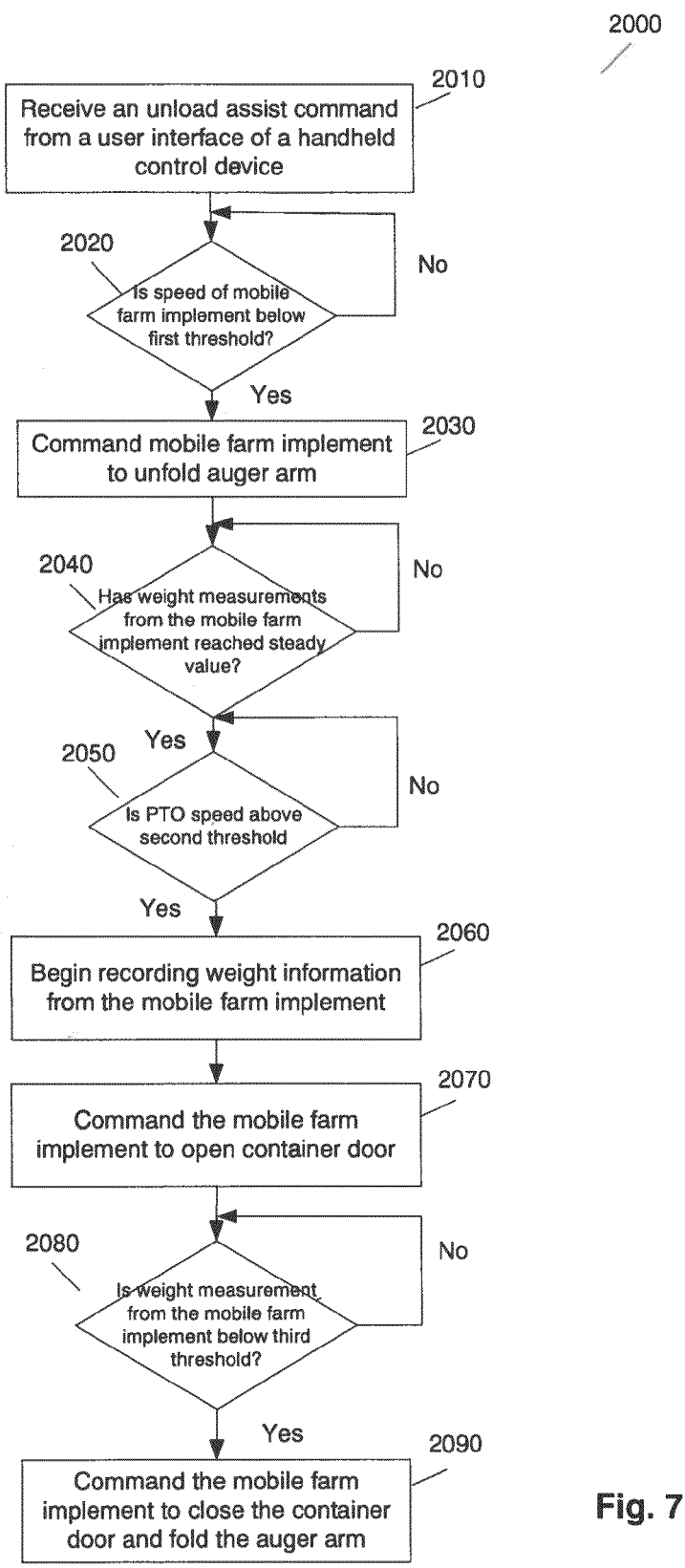
FIG. 7 illustrates a flow chart showing example operations of a method for automating unloading of a mobile farm implement.
Figure 8:
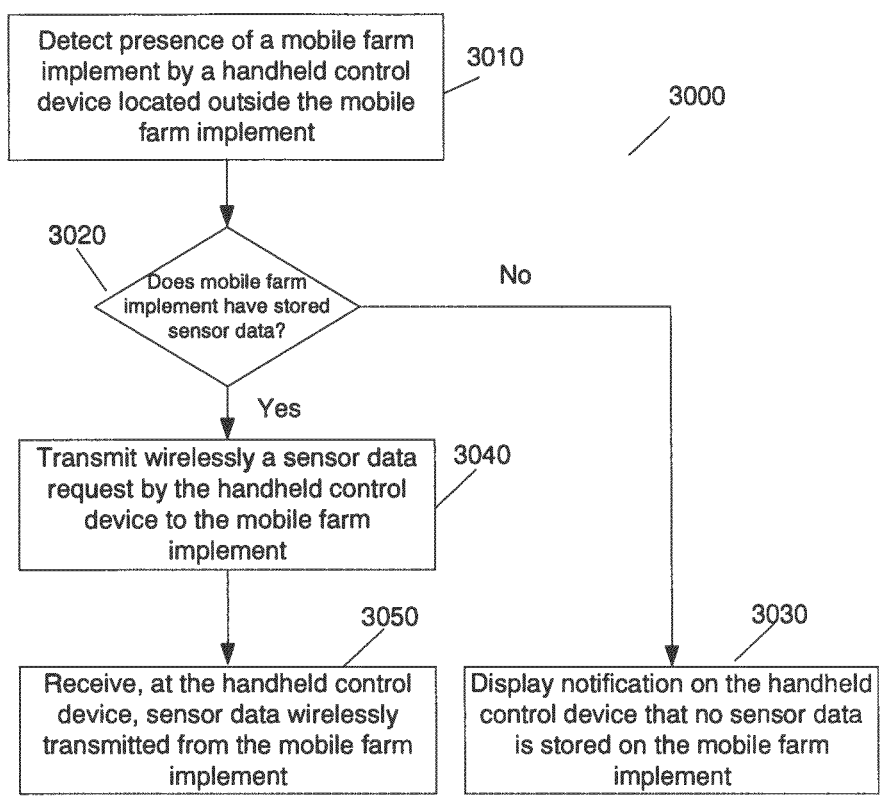
FIG. 8 illustrates a flow chart showing example operations for wirelessly receiving sensor data from a mobile farm implement by a handheld control device that is located outside the mobile farm implement.

FIGS. 6-8 illustrate example methods for interfacing with or controlling mobile farm implements, such controlling the tractor 200 or the grain cart 300 with the control device 100 or any other control device.

In an embodiment, a control device such as the control device 100 may provide the advantage of supporting different mobile farm implements using different communication protocols. For example, one mobile farm implement may use the ISO 11783 (i.e., Isobus) communication protocol, while another mobile farm implement may use the ISO 11898 (i.e., CANbus) communication protocol. The handheld control device may thus consolidate control of multiple mobile farm implements to one control device and reduce cost for operators of multiple mobile farm implements. One example of a method 1000 of using the handheld control device to communicate with multiple mobile implements is illustrated in FIG. 6.

At an operation 1010, presence of a first mobile farm implement may be detected, such as by the communication sub-module 121 on the control device 100 or any other control device. The detection may be automatic, or may receive assistance from a user of the control device. For example, the control device may receive a sensor signal that identifies the presence of the first mobile farm implement, or may receive a user input indicating that the first mobile farm implement is present. In some cases, the received sensor signal may be a response to a polling signal previously sent by the control device to poll for presence of mobile farm implements.

At an operation 1020, a determination may be made that the first mobile farm implement uses a first communication protocol. In an embodiment, the determination may be based on the first mobile implement's model, manufacturer, or category (e.g., whether it is a tractor, grain cart, harvester, etc.). In an embodiment, the determination may be based on a signal from the first mobile implement that identifies the communication protocol it is using. The determination may be automatic, or may be assisted by user input.

At an operation 1025, a determination may be made on whether a description of the first communication protocol is stored on the control device. In an embodiment, the description may detail, for example, how a command to the first mobile farm implement may be formatted or transmitted, or how information from the first mobile farm implement may be interpreted. The description may be stored on, for example, the storage device 106 or the memory 107 of the handheld control device 100.

At an operation 1030, the description for the first communication protocol may be retrieved from a server in response to a determination that the description of the first communication protocol is not stored on the control device. In an embodiment, the server may be remote from the control device. For example, the control device may retrieve the description from a server over a wireless phone network such as a cellular network.

At an operation 1040, if the description of the first communication protocol is stored on the control device or is retrieved from the server, communication of command or sensor information may be made with the first mobile implement using the first communication protocol. As an example, the control device may format the command to comply with the first communication protocol, and may use the protocol to interpret signals (e.g., signals carrying sensor information) received from the first mobile farm implement.

At an operation 1050, presence of a second mobile farm implement may be detected by the control device. The detection may be performed at a same time as the detection at operation 1010, or may be performed at a different time. For example, the first mobile farm implement and second mobile farm implement may interact with the control device simultaneously, or the control device may interact with one mobile farm implement after it has finished interacting with another mobile farm implement. Like in operation 1010, the detection may be performed by the control device 100 or any other control device, and may be done automatically or with assistance from a user.

At an operation 1060, a determination may be made that the second mobile farm implement uses a second communication protocol. The first communication protocol may be different than the second communication protocol. For instance, the two communication protocols may format communicated information differently, or may otherwise specify different ways to encode the communicated information for transmission.

At an operation 1065, a determination may be made on whether a description of the second communication protocol is stored on the control device. In an embodiment, the description may be stored on the storage device 106 or in the memory 107 of the control device 100, like at operation 1025. In response to a determination that the description of the second communication protocol is not stored on the control device, the description may be retrieved from a server, such as the server at operation 1030, or any other server. Like in operation 1030, the server may be remote from the control device, and may be accessed over a wireless phone network.

At an operation 1080, if the description of the second communication protocol is stored on the control device or is retrieved from the server, command or sensor information may be communicated with the second mobile farm implement using the second communication protocol. As an example, the control device may format commands to the second mobile communication based on the second communication protocol and may transmit the formatted command using a timing specified by the second communication protocol. The control device may decode signals, such as signals carrying sensor data or other information, using the second communication protocol.

In an embodiment, a control device such as the control device 100 may automate at least a portion of tasks performed by mobile farm implements. FIG. 7 illustrates example operations of a method 2000 of automating at least part of the unloading of agricultural material from a mobile farm implement, such as the unloading of a grain cart. In an embodiment, the unloading may involve unfolding an auger or conveyor of the mobile farm implement after the mobile farm implement has slowed to a certain speed, then opening a container door after a power takeoff actuating the auger has reached a sufficient speed, and monitoring a weight of the mobile farm implement to determine when to stop the unloading. The control device may thus automatically invoke these operations in a desired order and under desired conditions. The automation may free a user from having to manually initiate each operation in the unloading sequence and from having to manually monitor whether a desired condition for each operation is being satisfied.

At an operation 2010, an unload assist command may be received from a user interface of a handheld control device, such as control device 100. In an embodiment, the user interface may include a touch screen, and the unload assist command may be invoked through a button on the touch screen. In an embodiment, operations invoked by the unload assist command may be determined by the automation sub-module 128.

At an operation 2020, a determination may be made as to whether a speed of the mobile farm implement is below a first threshold. For example, the control device 100 may receive sensor information from the grain cart speed sensor 316 to determine whether the grain cart 300 is at or below a certain number of miles per hour. If the speed of the mobile farm implement has not slowed to the first threshold, the speed may continue to be monitored continuously or at discrete intervals.

At an operation 2030, the mobile farm implement may be commanded to unfold its auger arm (e.g., its upper conveyor section) in response to the determination that the speed of the mobile farm implement is below the first threshold. For instance, after the control device 100 determines that the grain cart 300 is at or below the threshold number of miles per hour, it may transmit an auger unfold command to the tractor interface converter box 210 or to the grain cart interface 330. The interface converter box 210 or the grain cart interface 330 may then cause the auger arm controller 322 to output signals that cause an unfolding movement of the auger 303 (see, e.g., FIG. 15 at A).

At an operation 2040, determination may be made as to whether weight measurements from the mobile farm implement has reached a steady value. The weight measurements may be used to determine how much agricultural material is left in the mobile farm implement during the unloading. Before the agricultural material is unloaded, however, the measurements may fluctuate because the mobile farm implement is moving. For instance, movement over an uneven surface may create acceleration or deceleration that changes a weight measured by a weight sensor. In an embodiment, the weight measurement values may reach a steady value when the speed of the mobile farm implement slows to the first threshold. In an embodiment, the measurements may be determined to be steady if they fluctuate within a predetermined range. As an example, the control device 100 may determine whether weight information from the load cell sensor 310 fluctuates at most within a predetermined range.

At an operation 2050, a determination may be made as to whether a power takeoff speed is above a second threshold. The power takeoff may be actuating the auger, which transfers agricultural material during the unloading. After the power takeoff engages the auger, the power takeoff may need to reach a threshold number of rotations per minute before it can be loaded with the agricultural material. As an example, the control device 100 may receive sensor information from the power takeoff sensor 313 and use that information to determine whether a rotational speed of the power takeoff 212 and the auger 303 has reached a second threshold. If the weight measurement at operation 2020 has not reached a steady value or the PTO speed at operation 2050 has not reached the second threshold, they may continue to be monitored continuously or at discrete intervals.

At an operation 2060, weight information from the mobile farm implement may begin to be recorded from the mobile farm implement in response to the determination that the weight measurements have reached a steady value and that the PTO speed has reached the second threshold. The weight information may be recorded to monitor the unloading process as agricultural material is transferred out of the mobile farm implement. For instance, the control device 100 may begin to record, at the storage device 106 or the memory 107, weight information from the load cell sensor 310.

At an operation 2070, the mobile farm implement may be commanded to open a container door in response to the determination that the weight measurements have reached a steady value and that the PTO speed is above the second threshold. In an embodiment, the container door may be separating the auger from the agricultural material being held in the container. Once the auger and power takeoff has reached a sufficient speed to be loaded, the container door may be opened so that the agricultural material can be transferred by the auger to another storage location (e.g., to a truck).

At an operation 2080, a determination may be made as to whether the measured weight of the mobile farm implement is below a third threshold. In an embodiment, the third threshold may correspond to a weight of the mobile farm implement when it is empty of agricultural material. In an embodiment, the third threshold may correspond to a user-specified weight. For instance, the user may wish to unload only a limited amount of agricultural material from the mobile farm implement. As an example, the control device 100 may determine whether a measured weight indicated by the load cell sensor 310 has reached or fallen below a third threshold.

At an operation 2090, the mobile farm implement may be commanded to terminate the unloading process. In an embodiment, the termination command may include a command to close the container door and fold the auger arm. For example, the control device 100 may transmit commands to the interface converter box 210 or the grain cart interface 330, which may in turn cause the container door controller 320 and the auger arm controller 322 to close the container door (see, e.g., FIG. 15 at 399) and fold the auger arm (see, e.g., FIG. 15 at B), respectively. In an embodiment, recording of weight measurements from the mobile farm implement may be stopped as part of the termination of the unloading process.

In an embodiment, the commands and monitored conditions may be executed or monitored in the order that is illustrated. In an embodiment, they may be executed or monitored in a different order. In an embodiment, automation of the unloading of the mobile farm implement may involve additional, fewer, or different commands or conditions to be monitored.

In an embodiment, a command or monitored condition may be specified by a user. In an embodiment, an order in which commands are to be executed by the mobile farm implement may be specified by the user. For instance, the control device may display a menu showing a plurality of commands that may be executed during an unloading sequence and a plurality of conditions that may be monitored during the unloading sequence. The user may be allowed to select which commands are to be executed, which conditions are to be monitored, and an order in which the commands are to be executed and in which the conditions are to be monitored. In an embodiment, the user may specify parameters for the commands or thresholds for the monitored conditions.

In an embodiment, a control device such as the control device 100 may allow a user located outside of a mobile farm implement to wirelessly collect information, such as sensor data, from the mobile farm implement. For example, a driver of a harvester may use the control device to wirelessly collect sensor data from the grain cart or any other mobile farm implement. In an embodiment, the driver may perform this data collection while sitting in the harvester, and does not need to walk up to the grain cart or to a tractor towing the grain cart. FIG. 8 illustrates example operations of a method 3000 of wireless data collection.

At an operation 3010, presence of a mobile farm implement may be detected by a handheld control device located outside the mobile farm implement. For example, the handheld control device 100 may detect a mobile farm implement (e.g., grain cart) while the control device 100 is being used by a user in another mobile farm implement (e.g., harvester). The presence may be automatic, or may be assisted by user input.

At an operation 3020, a determination may be made as to whether the mobile farm implement has stored sensor data. In an embodiment, a query may be transmitted to the mobile farm implement to ask whether it has stored sensor data. In an embodiment, the determination may be based on a category, model, or manufacturer of the mobile farm implement. The category, model, or manufacturer may also be determined through a query to the mobile farm implement.

At an operation 3030, if the mobile farm implement is determined to not have stored data, a notification that there is no stored data may be displayed on the handheld control device. If the mobile farm implement is determined to have stored data, a sensor data request may be wirelessly transmitted by the handheld control device to the mobile farm implement at an operation 3040. In an embodiment, the command may request all sensor data stored on the mobile farm implement. In an embodiment, the command may specify what sensor data is being requested.

At an operation 3050, sensor data may wirelessly received by the handheld control device from the mobile farm implement. In an embodiment, the wireless communication may be based on a preexisting protocol such as IEEE 802.11, IEEE 802.16, Bluetooth®, or any other wireless communication protocol.

Figure 9A:
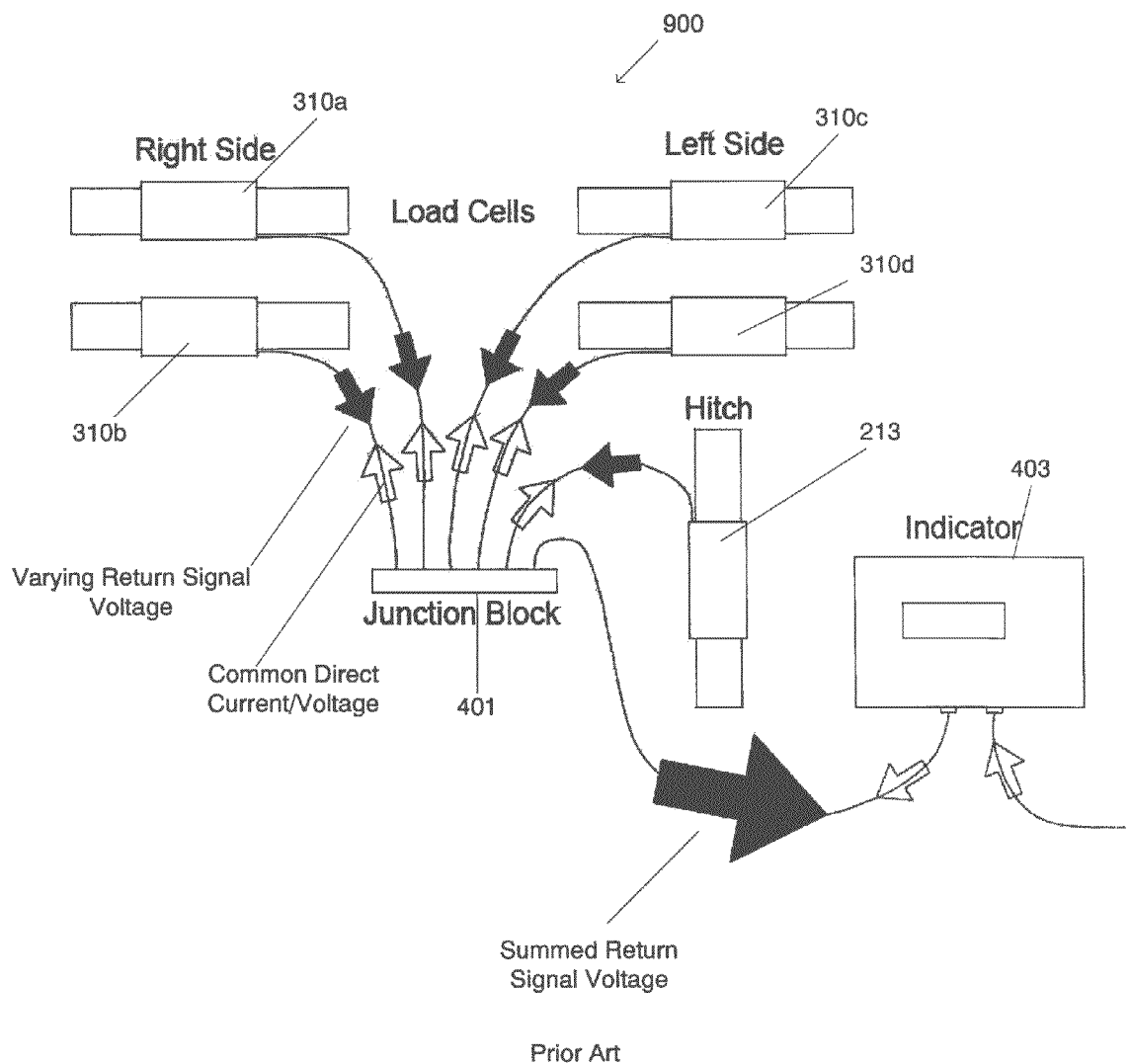
FIGS. 9A-9B illustrate a system of load cell sensors and a hitch sensor for monitoring weight of a mobile farm implement.
Figure 9B:
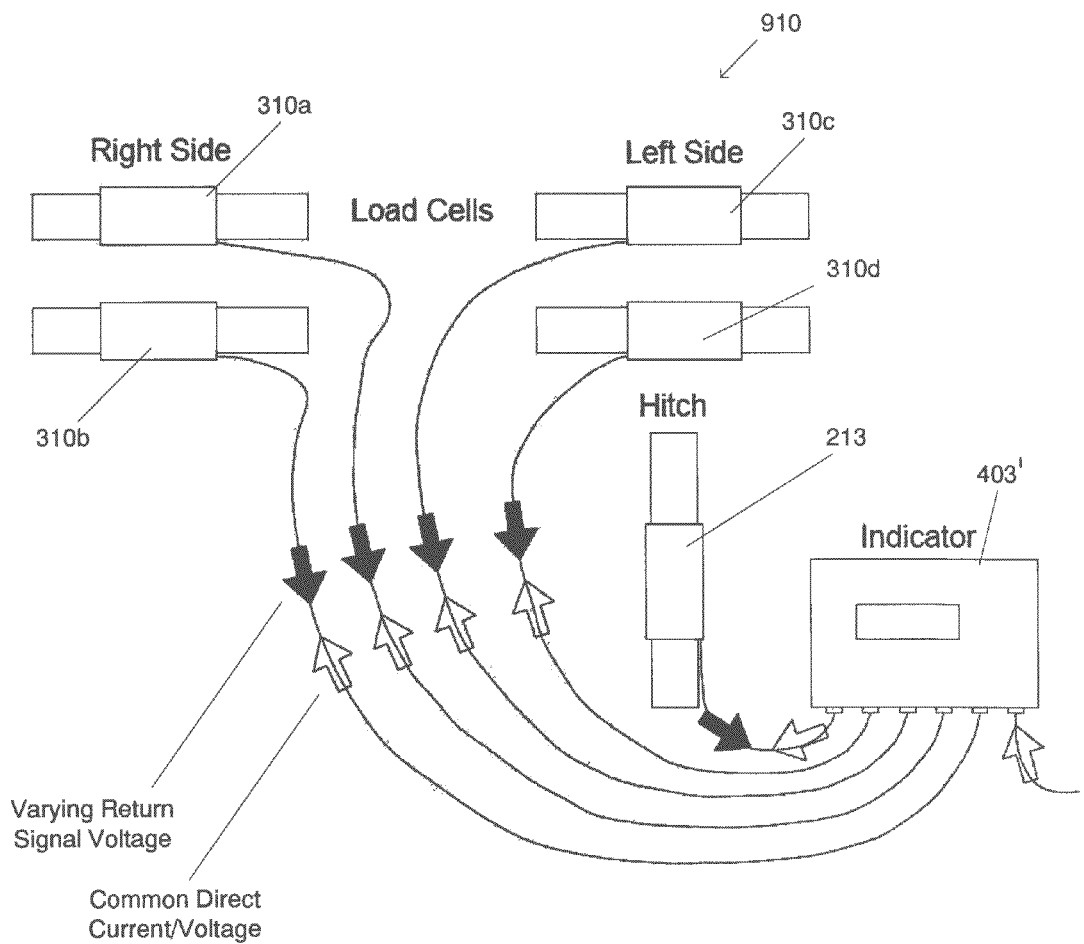

FIG. 9B illustrates a schematic of a sensor system for farm implements according to an embodiment of the present invention. In the sensor system 910 of the present invention, information from each sensor is sent to an indicator 403' according to the present invention (which can be a controller as shown in FIGS. 1-4 at 100, or a controller specially designed to perform the functions recited below), either directly (as shown in 9B) or via a junction block or box configured to maintain the individual signals. FIG. 9A illustrates a prior art sensor system 900 in which information from all of the sensors is combined and sent to conventional indicator 403 via a junction block or box 401. The sensor system 910 of the present invention is advantageous because each of the sensors can be monitored individually, whereas in the prior art system 900 only the sum of the sensors is transmitted to the indicator. Either sensor system 900 or 910 may be used for some of the sensor monitoring operations discussed below, however, the prior art system is not capable of performing certain operations discussed in further detail below, e.g., the roll over detection or hitch overload operation.

Figure 15:
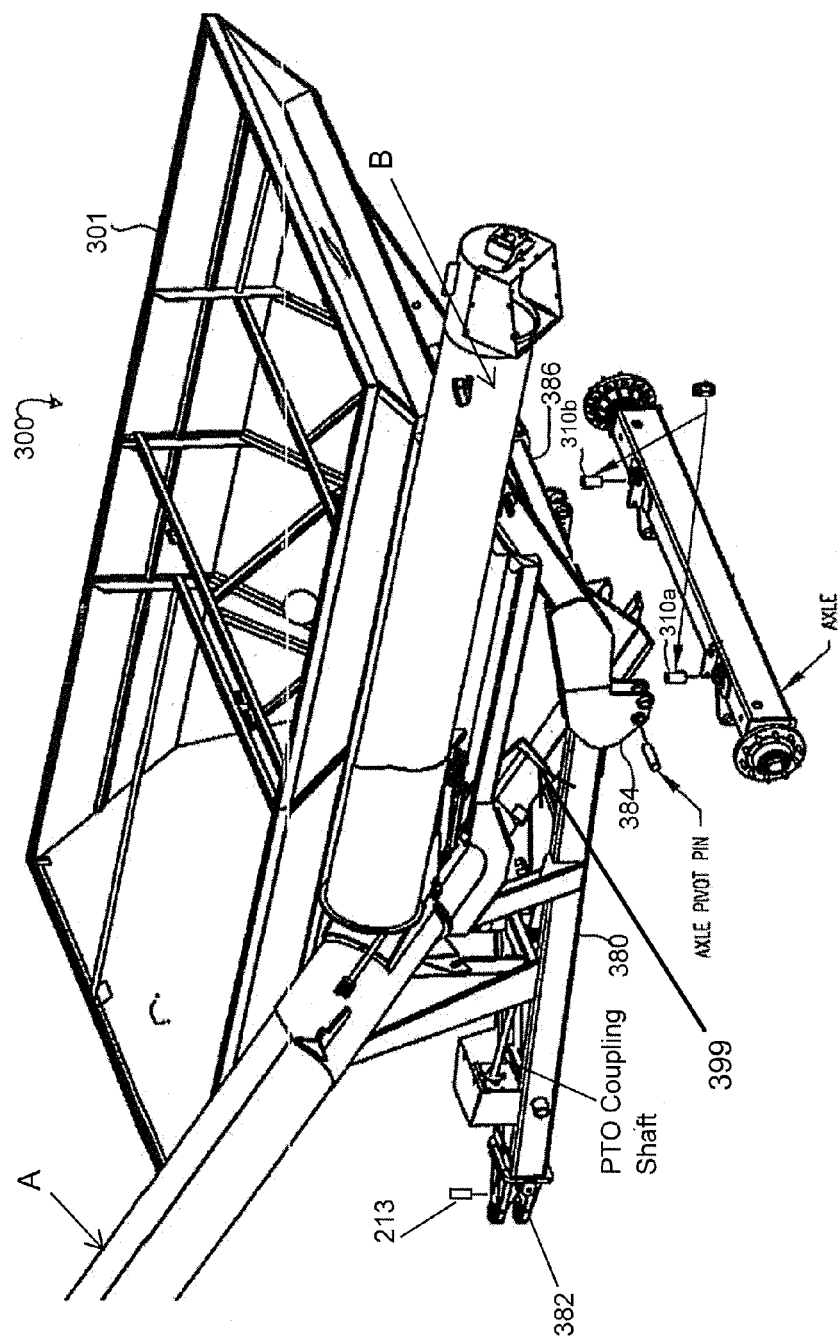
FIG. 15 is partial perspective view of an exemplary grain cart that can be unloaded according to embodiments of the present invention.

The sensor system 910 may be used with a plurality of weight or load sensors. The weight may be monitored with weight or load cell sensors, such as the sensors disclosed in co-owned U.S. Pat. No. 7,205,490, the entire contents of which is incorporated herein by reference. A plurality of weight sensors may be distributed throughout the mobile farm implements, such as the grain cart 300 or the tractor 200. For example, FIG. 15 illustrates an exemplary grain cart 300 including a bin or hopper 301, a support frame 380, a hitch 382, a first side 384 and a second side 386. The weight sensors may be distributed throughout the cart 300, such as weight sensors on the first side of the cart, the second side of the cart and the hitch. In an embodiment of the present invention, load cell sensors 310a-310d (e.g., load bars) may be placed throughout the grain cart 300 (e.g., between the hopper or container of the grain cart and its support frame) and a hitch sensor 213 may be included in a hitch of the tractor 200 or a tongue of the grain cart 300. The load cell sensors 301a-301d may measure a weight distribution of agricultural or other material in the grain cart 300. For example, each of the load cell sensors 310a-310d may be placed at different locations beneath a hopper of the grain cart 300 to measure a local pressure or weight at each of the different locations. For example, the system 910 may include four load cell sensors positioned, respectively, at a back right corner 310a, a front right corner 310b, a back left corner 310c, and a front left corner 310d of the grain cart 300. In the sensor system 910 of the present invention, each of the sensors 301a-301d may be monitored individually to detect a weight imbalance or a rollover condition in the grain cart 300, such as by comparing the load of each sensor to the load on the other sensors. The method for detecting a rollover condition or weight imbalance using the sensor system 910 is discussed in more detail below.

In an embodiment, the hitch sensor 213 may measure a force experienced by a hitch or tongue on the tractor 200. The hitch sensor 213 may be positioned on the tongue or the hitch of the tractor. The hitch sensor 213 may measure the force along various directions, such as along a vertical direction, along a towing direction, along a direction transverse to the towing direction or along any other direction. When a tongue of the grain cart 300 is attached to the hitch, the tongue will exert a force on the hitch in various directions while being towed. For example, the tongue may exert a positive (downward) or negative (upward) force on the hitch depending on the weight and orientation of the towed farm implement. The tongue will exert a downward force on the hitch when the grain cart 300 is loaded with material, and will exert a greater downward force when more material is loaded in the front of the cart or the cart is being transported down an incline. The tongue may exert an upward force on the hitch if more weight of the grain cart 300 is distributed toward its rear or if the cart is being transported up an incline. Further, the tongue may exert a force transverse to the towing direction when the tractor 200 is turning with the towed grain cart 300. A greater transverse force will be exerted on the hitch if the turn angle is too sharp or the tractor 200 is moving too quickly while turning with the grain cart 300. In an embodiment, the hitch sensor 213 may be adapted to measure a force along one of those directions and communicate the sensor reading to a controller or indicator 403'. In another embodiment, several sensors can be used to measure forces in more than one direction and communicate multiple sensor readings to a controller or indicator. If one or more of the forces on the hitch sensor 213 exceed a threshold, an alarm may be activated to indicate a hitch overload risk. When the hitch is overloaded, the grain cart 300 may break the hitch of the tractor, hitch on the grain cart or damage the weight sensor.

In an embodiment, sensor information may be communicated to an indicator configured to perform the functions described herein, such as indicator 403' in FIG. 9B. FIG. 9A illustrates a prior art system 900 in which each of the load cell sensors 310a-310d and hitch sensor 213 may first be connected to a junction block or box 401, which may perform various pre-processing on sensor signals. For example, the junction box 401 may combine various sensor measurements and return the sum of the various measurements to the indicator 403. FIG. 9B illustrates a sensor system 910 according to the present invention in which information from the sensors 310a-310d and hitch sensor 213 may be transmitted directly to indicator 403'. For example, the sensors may be in direct communication with the indicator 403', in which case the junction box may be eliminated. In another embodiment, the junction box may be configured to transfer individual or individually-discernable sensor responses to the indicator. In an embodiment, the junction box may multiplex information from the individual sensors into a signal that may be de-multiplexed by the indicator to discern or obtain information specific to each individual sensor. In an embodiment, information from the sensors may be grouped into a plurality of signals, e.g., by combining information from sensors on a first side of the implement (i.e., a first group of sensors) into a first signal and combining information from sensors on a second side of the implement (i.e., a second group of sensors) into a second signal, and communicating the first and second signals to the indicator as individually discernable signals.

The indicator 403' may be located at the tractor 200, the grain cart 300, or at any other location. It may communicate with the sensors via wired connections or communicate with them wirelessly. In an embodiment, the indicator 403' may be integrated into a control device existing on the grain cart 300 or tractor 200, such as in a control for the grain cart conveyor. In another embodiment of the present invention, the indicator 403' may be an application on a mobile phone (e.g., iPhone®), a tablet computer (e.g., iPad®) or any other hand-held electronic device. In another embodiment of the present invention, the indicator 403' may be a device specifically designed to perform the functions described herein.

Figure 9C:
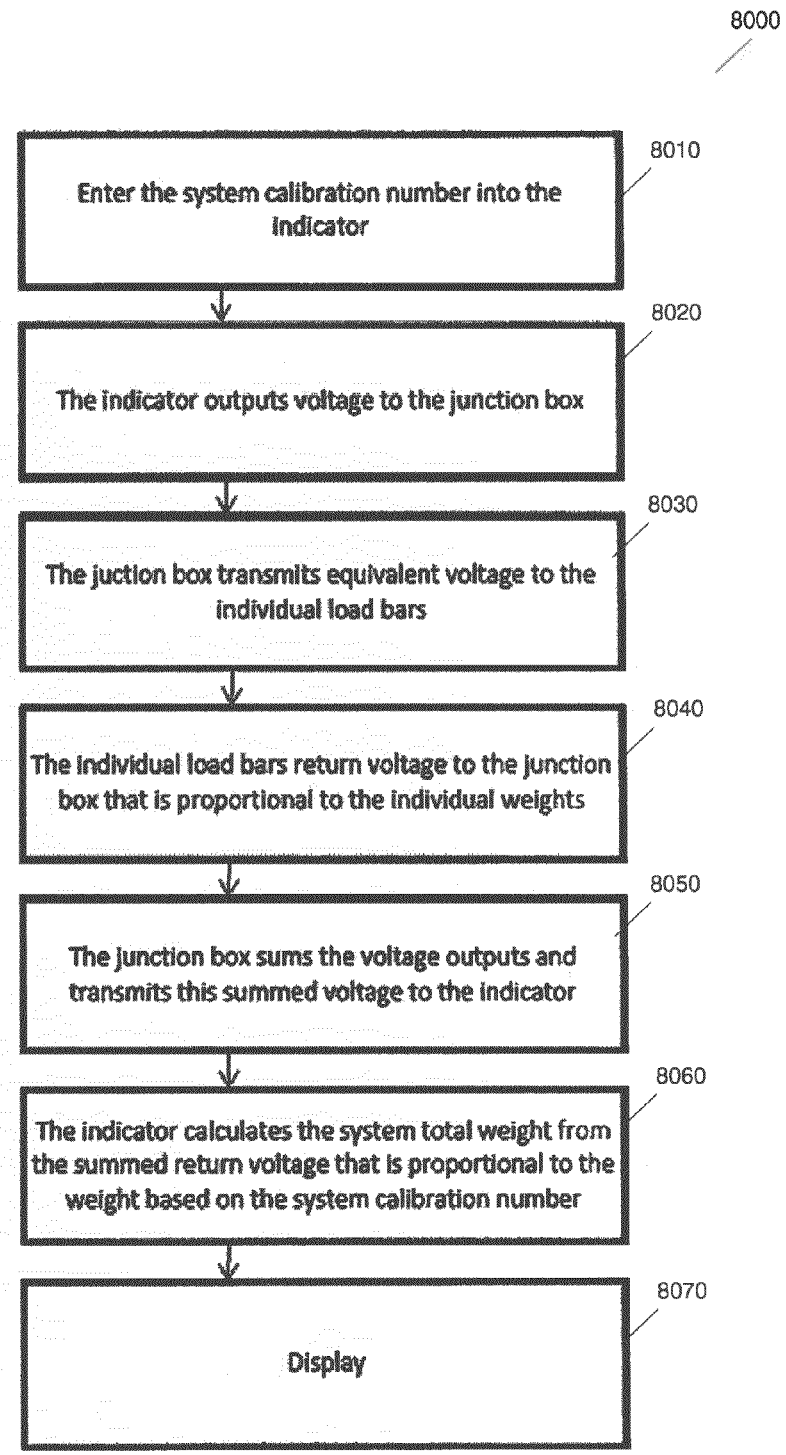
Figure 9D:
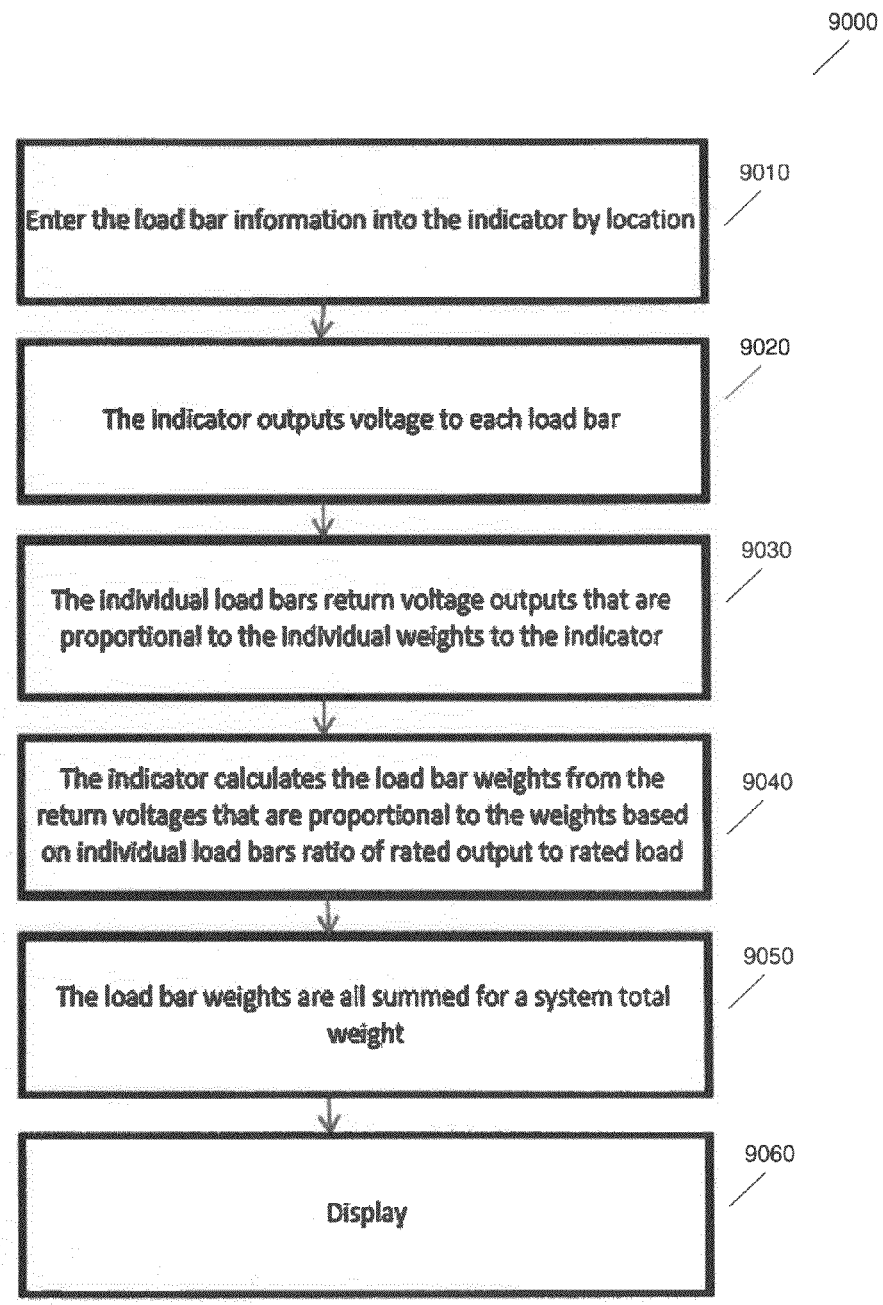

FIGS. 9C-9E illustrate various methods for tracking hopper weight through using load bars or any other load sensors. The methods in FIGS. 9C-9E may be performed by the sensor system 910 of the present invention.

FIG. 9C illustrates a method 8000 for monitoring a total weight of a hopper of the grain cart 300 according to an embodiment of the present invention. The method illustrated is for a sensor system 900 including a junction block or box. At an operation 8010, an indicator 403' may receive calibration numbers. In an embodiment, the calibration numbers may correspond to all sensors in communication with the indicator 403'. In another embodiment of the present invention, calibrations may be entered for each load cell sensor (e.g., load bar) located in a mobile farm implement. At operations 8020 and 8030, the indicator may solicit a measurement from load cell sensors in the mobile farm implement by outputting a voltage, which may be relayed by a junction block (e.g., junction block 401) to the sensors. At an operation 8050, the junction block may receive responses, e.g. a voltage, from the sensors representing a measured weight. The junction block may sum the voltages and return the summed voltage to the indicator. The summed voltage corresponds to a sum of the weights measured by the individual load cell sensors. The sum may be a sum of all load cells in the mobile farm implement, which may represent a total weight of a hopper or container in the mobile farm implement. At operation 8060, the indicator may calculate the total weight of the system from the summed voltage received by the junction box. The calculation may include the calibration number(s) previously entered. At operation 8070, the total weight of the system is displayed. In an embodiment, the indicator 403' includes a screen capable of displaying the system weight. In another embodiment of the present invention, the indicator 403' may be in communication, e.g. wirelessly or via USB cable, with a device capable of displaying the system weight.

In the method illustrated in 9C, the system weight may also be monitored without such a junction box that sums up the readings from each sensor by the indicator 403' receiving information from each sensor individually (e.g., directly from each sensor), such as in system 910. This system and method is described in further detail below with respect to FIG. 9D.

FIG. 9D illustrates a method 9000 in which the indicator may monitor local weights at individual locations of the mobile farm implement or the weight of the entire farm implement according to an embodiment of the present invention. In operation 9010, an individual sensor or load bar or a group of sensors or load bars are entered into the indicator 403'. For example, an individual sensor such as the hitch sensor or the front right load sensor of the grain cart 300 may be chosen, or the load sensors on the right side of the grain cart may be chosen, or all of the load sensors in the grain cart may be chosen. In operation 9020, the indicator 403' solicits a measurement from the load cell sensors previously entered. At operation 9030, the indicator receives a return response from each of the individual load cell sensors to which voltage was output. The individual return voltages allows the indicator to calculate, at operation 9040, local weights at various load cells of the mobile farm implement. The local weights may be summed at operation 9050 to determine a total weight of a hopper or container of the mobile farm implement. The calculated weight may be displayed at operation 9060.

Monitoring individual load cells (e.g., individual load bars) may allow better detection of overload of a particular load cell, even when the load cells as a whole are not overloaded.

FIG. 9E illustrates a table showing different rated loads for different load bars. Monitoring individual load cells also facilitate detection of rollover or tip-over conditions in a mobile farm implement, as discussed in further detail below.

Figure 10:
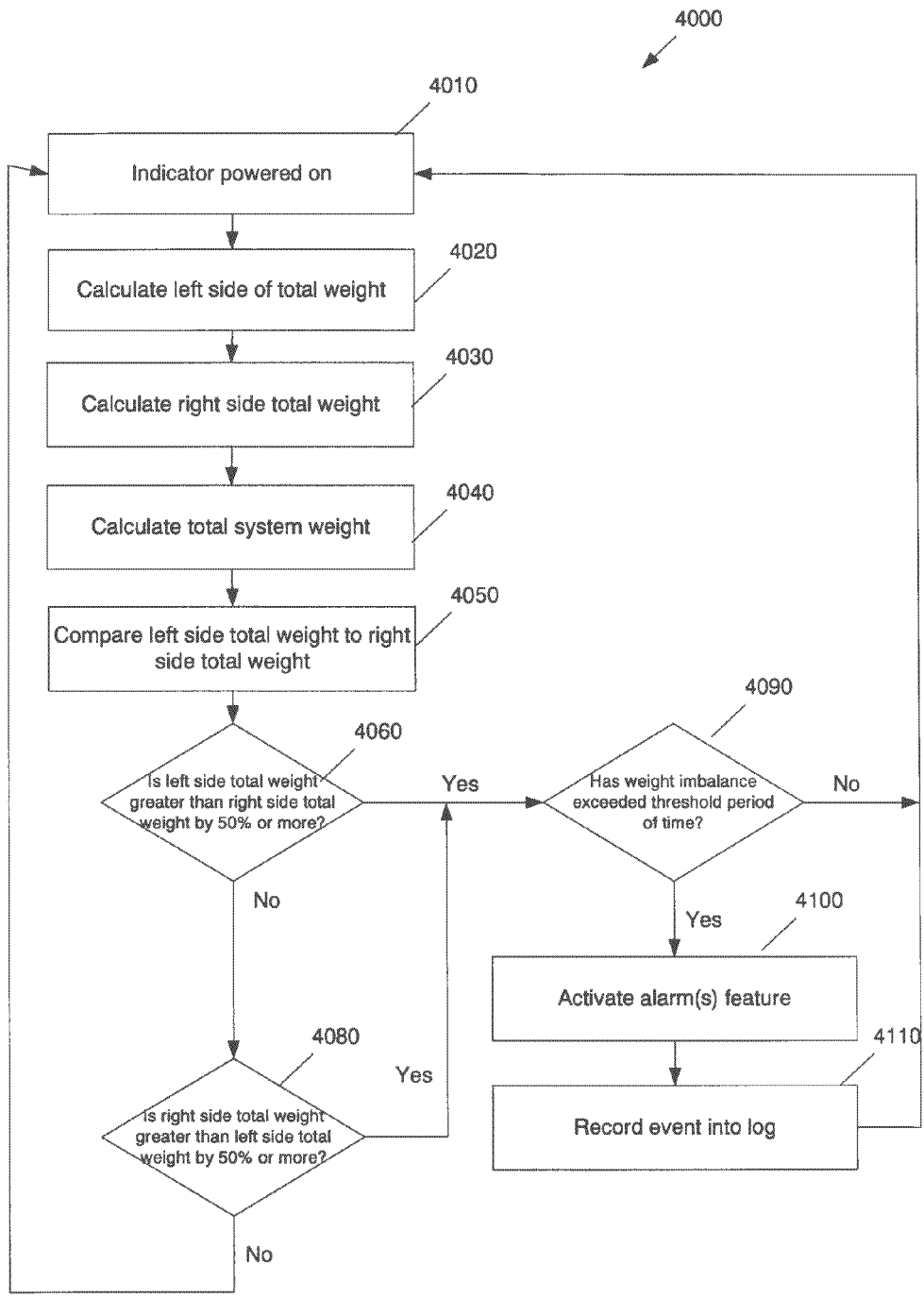
FIG. 10 illustrates a method of detecting a rollover or tip-over condition in a mobile farm implement.

FIG. 10 illustrates a method 4000 for detecting a rollover or tip-over condition based on sensor measurements. It may be performed by the indicator 403' of FIG. 9B or any other suitable device configured to perform the functions described herein. In this method 4000, the indicator 403' may determine, based on measurements of load cell sensors, whether there is a weight imbalance in the grain cart 300. The weight imbalance may indicate that the grain cart 300 is loaded asymmetrically or on an uneven surface, such as on a banked surface. A weight imbalance that exceeds a threshold value and that exists for more than a threshold duration may reflect a risk that the grain cart 300 will roll over or tip over. When a rollover risk is present, the indicator 403' will log the event and activate an alarm to make an operator aware of the risk.

At an operation 4010, the indicator (e.g., indicator 403') may be powered on. The indicator 403' may be powered on manually or automatically, such as when the tractor begins transporting the farm implement being monitored for rollover or when the farm implement is loaded.

At an operation 4020, a total weight of a left side of a mobile farm implement may be calculated. The total weight on the left side may measure, for example, a total weight of agricultural or other material on a left side of the mobile farm implement. As an example, indicator 403' may receive sensor measurements from sensors on the left side of the farm implement (e.g., 301c, 310d) and sum up the weight measurements received from these load cell sensor (310c, 310d).

At an operation 4030, a total weight of a right side of the mobile farm implement may be calculated. For instance, indicator 403' may receive sensor measurements from sensors on the right side of the farm implement (e.g., 310a, 310b) and sum up the weight measurements received from these sensors (310a, 310b).

At an operation 4040, a total weight of agricultural or other material in the mobile farm implement may be calculated. In an embodiment, the total weight may be calculated based on (e.g., by adding) the results of operation 4020 and operation 4030 and any other weight sensor measurements received, e.g. any centrally located weight sensors.

At an operation 4050, the total weight on the left side of the mobile farm implement may be compared with the total weight on the right side of the mobile farm implement. For example, if the grain cart 300 is on a banked surface, agricultural material may shift from one side of the grain cart to an opposite side, which will result in the weight on one side of the cart exceeding the weight on the other side.

At operations 4060 and 4070, a determination may be made as to whether the total measured weight on the left side exceeds the total measured weight on the right side or vice versa by a threshold, such as fifty percent or any other percentage of the total weight of the opposite side. In an embodiment of the present invention, the threshold is pre-determined. In another embodiment of the present invention, the threshold may be entered by an operator. The degree of weight imbalance may reflect a steepness of the banked surface, and a higher degree of steepness may correlate with a higher risk that the grain cart 300 will tip over. If the weight imbalance exceeds the threshold, a determination may be made at operation 4090 as to whether the weight imbalance has existed for more than a threshold period of time.

At an operation 4100, one or more alarm features (e.g., auditory, vibration, visual and/or electronic signal) may be activated in response to a determination that the weight imbalance exceeds the threshold. For example, the indicator 403' may output or transmit an alarm indication to an operator of the tractor 200 or grain cart 300. The alarm may be a separate system from the indicator (e.g., on the tractor 200 or grain cart 300) or may be a feature on the indicator 403'. The alarm may indicate a risk that the grain cart 300 is at risk to tip or roll over due to uneven weight distribution across the grain cart 300. Further, at an operation 4110, various information relating to the rollover condition may be recorded in an event log. In an embodiment of the present invention, a controller or indicator may run the roll over detection operation 4000. The controller may be a handheld device 100 (as discussed above), incorporated into an existing controller on the farm implement or tractor, or it may be a separate unit specifically designed for this operation.

Figure 11:
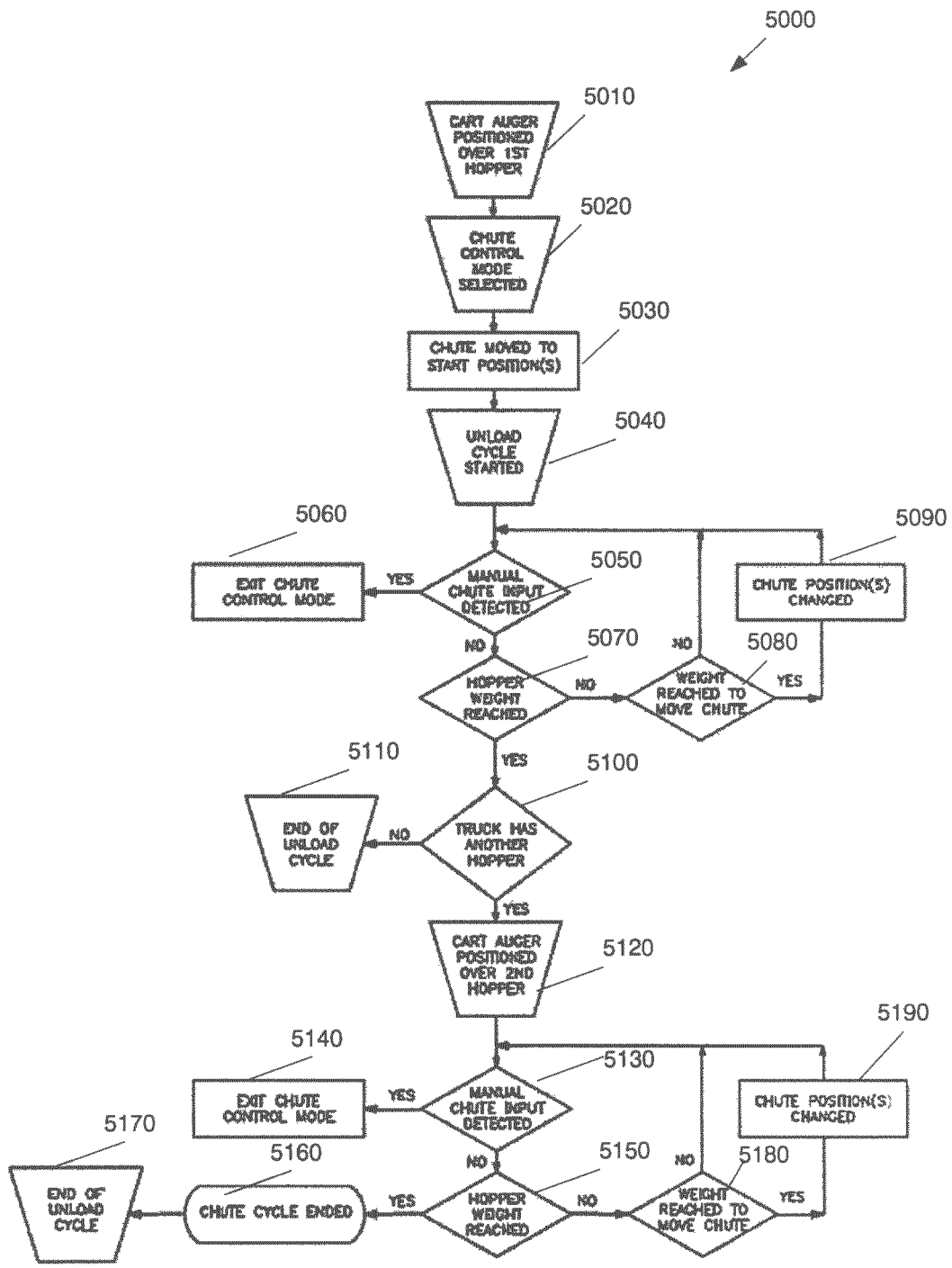
FIG. 11 illustrates a method of recording chute position during a chute positioning learn mode.

FIG. 11 illustrates a method 5000 that may automatically move a chute being used in unloading a mobile farm implement. The chute control function may be implemented using a controller, such as control device 100, or in a controller mounted on the tractor 200 or the grain cart 300. The method 5000 may be used for a chute mounted at a discharge end of a conveyor (e.g., an auger conveyor) and rotatable about at least one axis of rotation. The movement of the chute may, for example, facilitate an even distribution of agricultural material across the hopper. In an embodiment, the method 5000 may rely on accessing movement data recorded from previous unload operations, as discussed in further detail below with respect to FIG. 12. In the embodiment, the replay method 5000 may replay the recorded movements as a function of a measured weight from a hopper being unloaded, measured weight of a hopper into which the chute is unloading material or as a function of time.

Operations 5010 through 5040 involve preparing the chute to enter a control mode, which then automates movement of the chute. Operations 5010 through 5040 moves the chute into a start position and activates the control mode. In an embodiment, if the control mode relies on previously recorded movements of a chute, the start position of the chute in the control mode may match a start position of a chute in a learn mode.

During the control mode, a determination may be made periodically at operation 5050 as to whether a manual input is received. A manual input may terminate the automation in the control mode (operation 5060). If no manual input is received, the control mode will monitor the weight of the hopper to determine if the weight of the hopper has been reached at operation 5070. If the hopper weight has not been reached, the system may move the chute based on a weight of the hopper at operation 5080. For example, the control mode determines whether the hopper has reached a weight that would trigger another incremental movement of the chute. In response to determining that the hopper has reached that weight, the control mode moves the chute by an incremental amount at operation 5090. The chute may have a plurality of positions it will move through while loading a hopper, e.g., a left position, a center position and a right position. In an embodiment of the present invention, the chute can move in at least two planes, and the system may move the chute through positions in both planes, e.g., front left, back left, front center, back center, front right and back right. At various periods, such as after each incremental movement, the control mode may determine at operation 5070 whether the hopper weight (e.g., maximum weight) has been reached. If the hopper weight has been reached, the control mode terminates unloading of material into the hopper.

At an operation 5100, a determination is made as to whether there is another hopper into which material can be unloaded. If there is not, the unload cycle is terminated at operation 5110. Otherwise, the control mode may automate another series of incremental movements of the chute at operations 5120 through 5190. Operations 5120 through 5190 are substantially similar to operations 5050 through 5090. In an embodiment of the present invention, a controller or indicator may run the unload method 5000. The controller may be a handheld device 100 (as discussed above), incorporated into an existing controller on the farm implement or tractor, or it may be a separate unit specifically designed for this operation.

Figure 12:
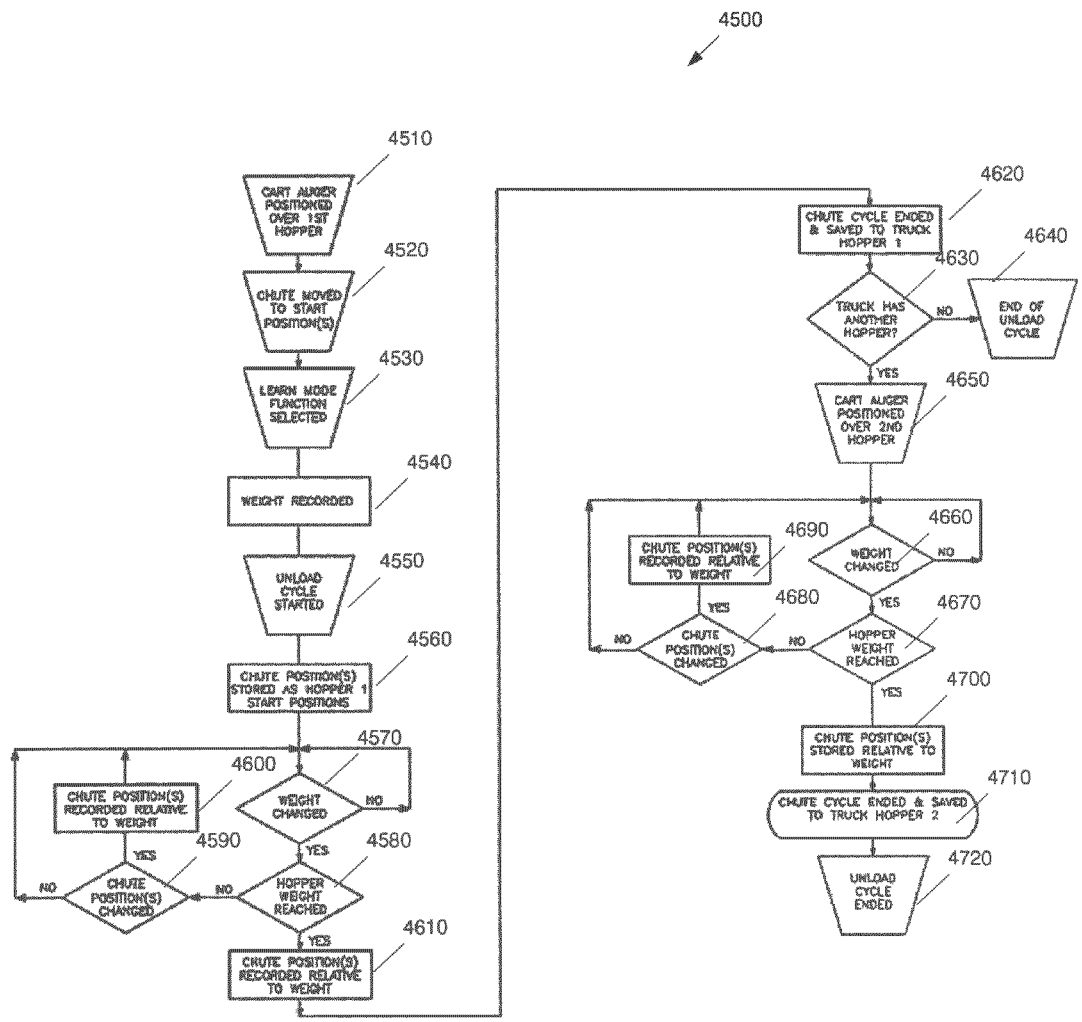
FIG. 12 illustrates a method of using recorded chute position to automate chute movement during a chute control mode.

FIG. 12 is a flow chart illustrating a method 4500 of unloading a mobile farm implement by controlling the position of a chute discharging material into a container, according to an embodiment of the present invention. The method 4500 involves a learn mode function that stores chute positions during unloading of the implement. The stored positions may later be used to automate movement of the chute during unloading, such as the chute control operation detailed above with reference to FIG. 11. The learn mode function may be implemented on a controller, such as control device 100, or a controller mounted on the tractor 200 or the grain cart 300.

Operations 4510 to operations 4550 involve moving the chute to a start position. The chute may be located at an end of an auger, and may be moved in part by moving the auger (operation 4510), such as positioning the auger over a first hopper. Once an auger is placed, the chute may be moved to a start position, such as a center or a side of the hopper (operation 4520). The learn mode function may be enabled, a weight of the hopper being unloaded or of the mobile farm implement into which the chute is discharging material may be recorded (operations 4530 and 4540), and an unload cycle may be started (operation 4550). Operations 4510-4550 may be manual or automatic.

At an operation 4560, a start position of the chute may be recorded. In an embodiment, the start position may be the position of the chute relative to the auger or relative to the hopper into which material is being unloaded.

As the hopper begins to be filled, the chute may be moved. At an operation 4570, a determination is made as to whether the hopper weight has changed. If the weight has changed, the method 4500 observes at operation 4590 whether the chute position has changed. The operation may thus learn whether an operator of the mobile farm implement has moved the chute as the hopper is being filled, and may learn a direction or amount of such movement. At an operation 4600, the chute position relative to the recorded weight is recorded if the position of the chute has changed. Operations 4590 to 4600 may thus record how an operator moves the chute as a function of hopper weight during unloading of material into the hopper. Such recorded movement may later be replayed to automate movement of the chute.

Once a target weight of the hopper being filled is reached (4580), the various positions of the chute relative to the weight is recorded 4610 and the cycle is ended and saved for the first hopper 4620. The learn mode operation 4500 may include a step of identifying the hopper being filled, e.g., an identification code for particular hopper volumes or hopper shapes. The user may manually enter this code or the hopper may identify itself (e.g., make and/or model of hopper) by sending a signal to the indicator or controller running the learn mode.

At an operation 4630, a determination may be made as to whether there is another hopper which needs to be loaded by the chute. If there is no other hopper, the unload cycle is terminated at operation 4640. If there is another hopper, another chute learn mode is carried out at operations 4650 through 4710. The operations are substantially similar to operations 4560 through 4610. At an operation 4720, which assumes that no more than two hoppers are being filled, the unload cycle is terminated. In an embodiment of the present invention, there may be more than two hoppers filled and recorded by the learn mode. In an embodiment of the present invention, a controller or indicator may run the learn mode. The controller may be implemented in a handheld device 100 (as discussed above), or in a controller mounted on the farm implement or tractor.

Figure 13:
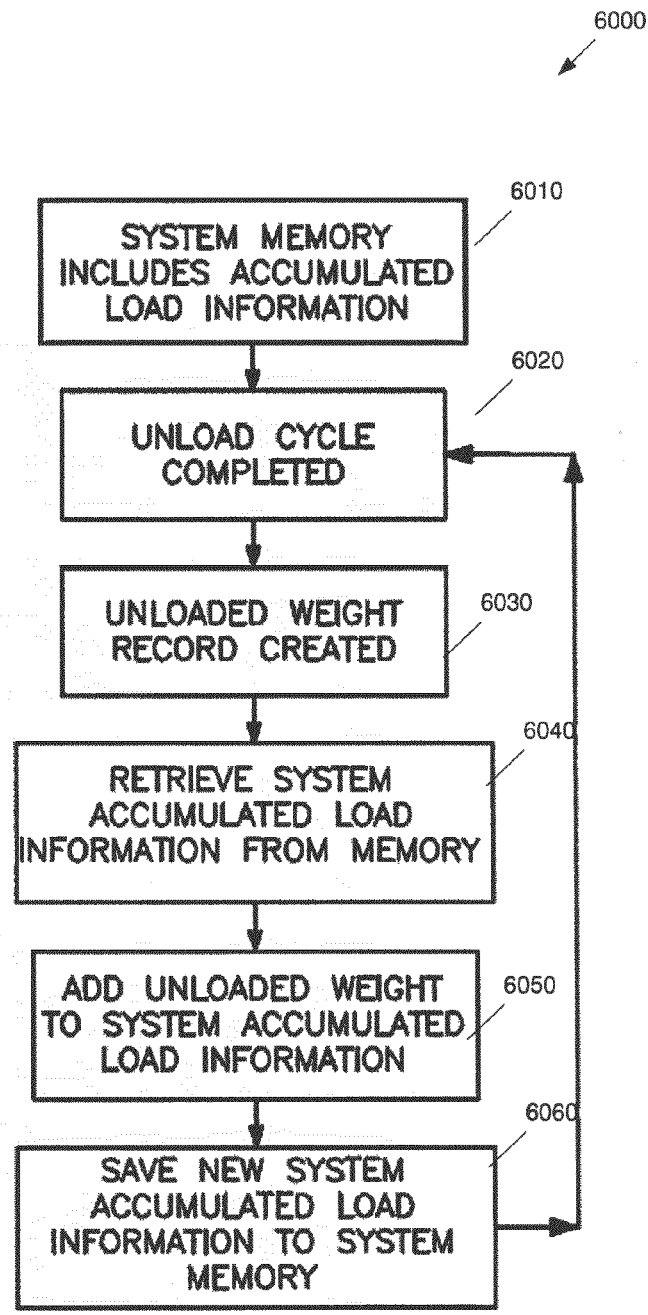
FIG. 13 illustrates a method of tracking a cumulative amount of material unloaded from a mobile farm implement.

FIG. 13 illustrates an accumulative load tracker method 6000 that may track a cumulative amount of material that a mobile farm implement (e.g., the grain cart 300) has unloaded over a plurality of unload cycles.

At an operation 6010, a system memory (e.g., on a controller) may store information that indicates an accumulated amount of material that has been in a farm implement up to a present time. At operations 6020 through 6060, an unload cycle is performed and completed, during which additional material is unloaded. At an operation 6030, a weight of the material that has been unloaded in the cycle is determined and recorded. At operations 6040 and 6050, the weight of the material unloaded in the cycle is added to the cumulative weight of material that has been unloaded in previous unload cycles. The updated cumulative weight is then saved to system memory at operation 6060. Additional information may be stored with the cumulative weight, such as how many unload operations have been performed and the amount of weight unloaded during each of these operations. In an embodiment of the present invention, a controller or indicator may run the method 6000. The controller may be a handheld device 100 (as discussed above), incorporated into an existing controller on the farm implement or tractor, or it may be a separate unit specifically designed for this operation.

Figure 14:
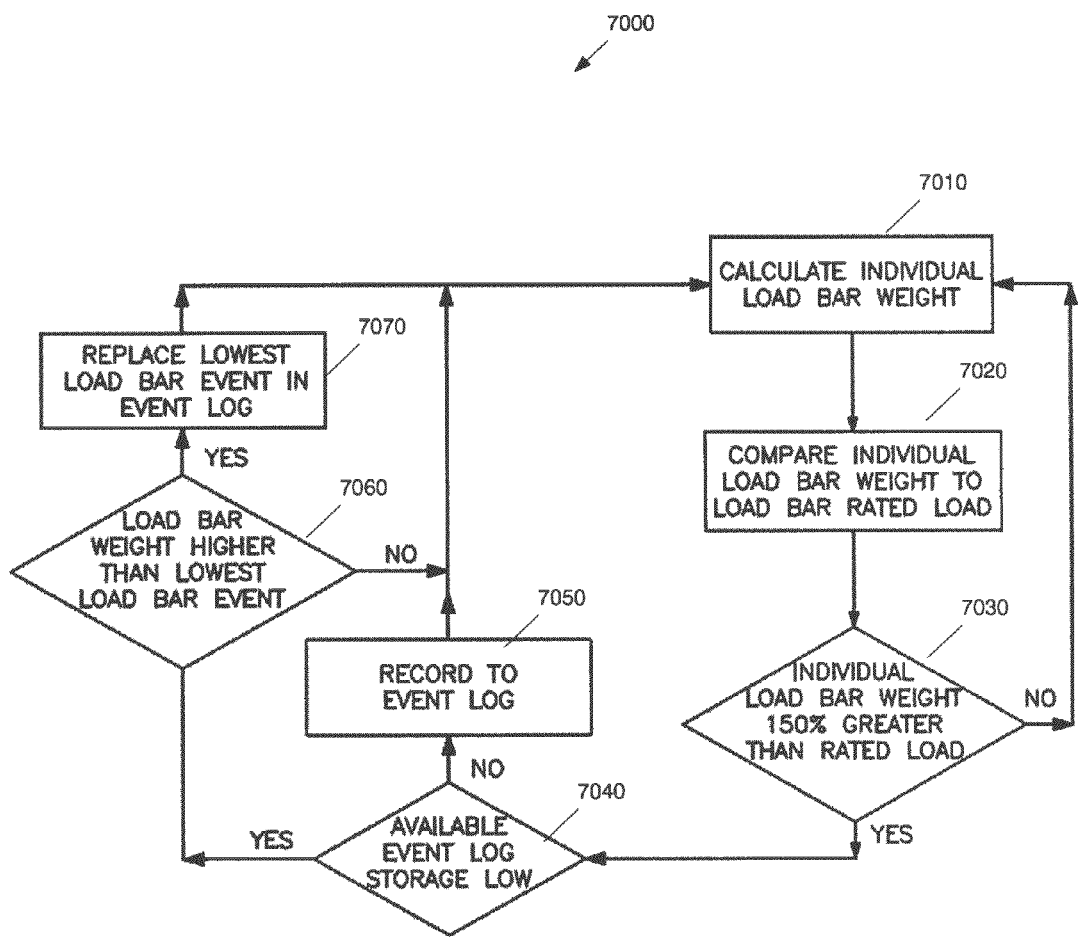
FIG. 14 illustrates a method of tracking events in which a load bar weight exceeds its rated load.

FIG. 14 illustrates a method 7000 for monitoring load bar weights to determine whether any of the weights have exceeded a rated load. The load bar weight measurements may be monitored individually or as a total weight. Monitoring the load bar weights individually may provide easier diagnostics and tracking.

At operation 7010, a weight of an individual load bar is received and calculated by a controller, such as the handheld device 100. At operation 7020, the calculated weight is compared to its rated load, which may be stored in the system as shown in FIG. 9E. A determination is made at operation 7030 as to whether the rated load has been exceeded by more than a threshold, such as 150%. The threshold may be any value relative to the rated load. In an embodiment, the threshold is a pre-determined amount provided by the manufacturer or distributor.

If the weight of the load bar exceeds the threshold, the excess may be recorded as a weight excess event in an event log at an operation 7050. The weight excess event recording may include the load bar weight or the percentage of the load bar weight relative to the rated load and the date and time of the event. In an embodiment, each weight excess event is recorded in an event log on the controller/indicator. In an embodiment, the event log may be downloaded from and/or displayed by the controller/indicator.

In some instances, however, the event log may have limited storage. Thus, in an embodiment, a determination may first be made as to whether the event log storage is low. If the event log storage is low, a determination may be made at operation 7060 as to whether the load bar weight is higher than a lowest weight currently recorded in the log. If the load bar weight does not exceed the lowest logged weight, the method may determine that the weight excess event does not have sufficient priority to be logged. If the load bar weight does exceed the lowest logged weight, it may replace the entry of that lowest bar weight in the event log at operation 7070. In an embodiment, the controller or indicator runs the method 7000. The controller may be a handheld device 100 (as discussed above), incorporated into an existing controller on the farm implement or tractor, or it may be a separate unit specifically designed for this operation.

In another embodiment of the present invention, a controller or indicator, such as handheld controller 100, may be configured to control the folding and unfolding of a conveyor. For example, the controller may be used to lock a conveyor in a stored or transport position when the mobile farm implement on which it is mounted is moving at a speed that is above a threshold speed. The controller may also move the conveyor into the stored or transport position if it is in an operating position and the speed of the mobile farm implement exceeds the threshold speed. In an embodiment, the conveyor may be moved between the operating and stored positions via folding, e.g., an upper conveyor section can be folded relative to a lower conveyor section. In an embodiment, these operations are performed by a controller configured to receive information from sensors indicating a position of the conveyor and a speed of the farm implement, and to control operation of one or more positioning devices (e.g., a hydraulic cylinder) coupled with the conveyor and configured to move the conveyor between operating and stored positions.

For example, the controller may be configured to lockout the unfolding of the conveyor of a farm implement in a stored position when a tractor is towing the farm implement. In such embodiment, the system may include a conveyor sensor configured to detect if the conveyor is in a folded position, an unfolded position or somewhere inbetween the folded and unfolded positions. When the tractor is in transport, the controller can receive information from a sensor measuring the speed of the tractor via a speed sensor on the tractor and/or the farm implement. If the speed sensor measurements exceed a certain threshold, the controller will determine the position of the conveyor through information from the conveyor sensor. If the auger is in a folded position, the controller will lockout the auger, i.e., the controller will prevent the auger from unfolding from the stored position into the operating position. If the conveyor is in an operating or unfolded position and the speed sensor measurements exceed a certain threshold, the conveyor may be folded into a stored position. If the conveyor is in a folded position and the speed sensor measurements are below a certain threshold, the controller will unlock the conveyor and allow it to be moved into an operating position. In an embodiment, once the speed sensor measurements are below a certain threshold, the system (e.g., the controller) can be configured to notify the operator that the conveyor may be unfolded, or even give an unfold command causing the hydraulic cylinder to unfold the conveyor. When the conveyor is in an operating position, the controller may continue to monitor the measurements from the speed sensor to determine when an unload operation may commence.

From the above it will be appreciated that the handheld control device of the present invention may automate at least part of an unloading process of a mobile farm implement, interact with multiple farm implements using multiple communication protocols, or wirelessly collect data from a mobile farm implement. It will also be appreciated that various changes can be made to the system without departing from the spirit and scope of the appended claims. For example, in an embodiment, a handheld control device is not limited to an iPad® or iPhone®, but may include an Android® mobile device, a Windows® mobile device, or any other handheld device. In an embodiment, the control device may have no auxiliary input device, and rely on only a touch screen for input. In an embodiment, the handheld control device may be configured to convert sensor information from a mobile farm implement into a spreadsheet format. In an embodiment, the handheld control device may be configured to communicate sensor information or other information via e-mail or SMS messaging. In an embodiment, the handheld control device may be configured to select from among multiple languages in which to present information on its user interface. In an embodiment, the handheld control device may be configured to convert values for sensor information between metric units and non-metric units.

In an embodiment, the mobile farm implements of this application are not limited to tractors or grain carts, but may include a harvester, combine, or any other mobile farm implement.

In an embodiment, the grain cart interface in the grain cart may lack a processor.

In an embodiment, sensors in the mobile farm implements may include an ultrasonic sensor, a camera, a hitch weight sensor, a tongue weight sensor, or any other sensor.

In an embodiment, a mobile farm implement may have an interface configured to interface with a physical joystick and to execute commands based on signals from the joystick.

In an embodiment, any spout of a mobile farm implement may be controlled via proportional control or discrete control. Proportional control may move the spout based on a value of a command signal, whereas discrete control may move the spout based on a pulse width of the command signal.

In various embodiments, the controller or control device may be a hand held control device, such as control device 100, or it may be a control device mounted on the farm implement or tow vehicle, such as a tractor.

It will also be appreciated that the above example components and operations are illustrative only, and that an embodiment of the present application may have fewer or more components or operations than those illustrated above, and have operations arranged in an order different than that illustrated above.

From the above it will be appreciated that the unload assist method of the present application allows for a farm implement to use measurements from sensors to safely and automatically perform an unload operation. Although the invention has been described based upon these preferred embodiments, it would be apparent to those of skill in the art that certain modifications, variations and alternative constructions could be made to the described embodiments within the spirit and scope of the invention. For example, the method could include a step of reducing the speed of the mobile farm implement until it is below the first threshold or increasing the speed of the power takeoff until it is above the second threshold.

We claim:

1. A method of controlling an unload operation of a mobile farm implement having a container carrying an agricultural material such as grain or seed, wherein the mobile farm implement is connected to a power takeoff and includes a conveyor for unloading the agricultural material, and wherein the conveyor is movable between a stored position and an operating position, the method comprising steps of:
   measuring a speed of the mobile farm implement;
   determining with a controller if the speed is below a first threshold; and
   when the controller determines that the speed is below the first threshold, sending a command from the controller to move the conveyor into the operating position.

2. The method of claim 1, further comprising steps of:
measuring a power takeoff speed;
determining with the controller if the power takeoff speed is above a second threshold; and
when the controller determines that the power takeoff speed is above a second threshold, unloading the agricultural material from the mobile farm implement.

3. The method of claim 2, further comprising steps of:
weighing an amount of the agricultural material in the mobile farm implement;
determining with the controller if the weight of the amount of the agricultural material is below a third threshold; and
when the controller determines that the weight is below the third threshold, stopping the unloading.

4. The method of claim 3, further comprising a step of:
when the controller determines that the weight is below the third threshold, sending a command from the controller to move the conveyor into the stored position.

5. The method of claim 3, wherein the step of unloading the agricultural material from the mobile farm implement includes the step of sending a command from the controller to open a container door.

6. The method of claim 5, wherein the step of stopping unloading includes a step of sending a command from the controller to close the container door.

7. The method of claim 2, further comprising the step of, prior to the unloading step, determining with the controller if a weight of the amount of the agricultural material is a steady value, and, unloading the agricultural material from the farm implement when the controller determines that the weight is a steady value.

8. The method of claim 2, wherein the unloading step includes engaging the power takeoff to facilitate transfer of the agricultural material.

* * * * *